(12) United States Patent
Hendry et al.

(10) Patent No.: US 12,155,836 B2
(45) Date of Patent: Nov. 26, 2024

(54) IMAGE/VIDEO CODING METHOD AND APPARATUS

(71) Applicant: LG ELECTRONICS INC., Seoul (KR)

(72) Inventors: Hendry Hendry, Seoul (KR); Seethal Paluri, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 17/780,719

(22) PCT Filed: Nov. 26, 2020

(86) PCT No.: PCT/KR2020/016884
§ 371 (c)(1),
(2) Date: May 27, 2022

(87) PCT Pub. No.: WO2021/107622
PCT Pub. Date: Jun. 3, 2021

(65) Prior Publication Data
US 2023/0013167 A1    Jan. 19, 2023

Related U.S. Application Data

(60) Provisional application No. 62/941,862, filed on Nov. 28, 2019.

(51) Int. Cl.
*H04N 19/615*    (2014.01)
*H04N 19/132*    (2014.01)
(Continued)

(52) U.S. Cl.
CPC ......... *H04N 19/132* (2014.11); *H04N 19/174* (2014.11); *H04N 19/176* (2014.11); *H04N 19/70* (2014.11)

(58) Field of Classification Search
CPC .. H04N 19/132; H04N 19/174; H04N 19/176; H04N 19/70; H04N 19/119;
(Continued)

(56) References Cited

U.S. PATENT DOCUMENTS 11,082,719 B2 * 8/2021 Hannuksela ......... H04N 19/167
11,445,187 B2 * 9/2022 Misra ..................... H04N 19/70
(Continued)

FOREIGN PATENT DOCUMENTS

CA    3056122 A1 * 10/2013    ............ H04L 47/10
CA    3113219 A1 *  3/2020    ........... H04N 19/119
(Continued)

OTHER PUBLICATIONS

Bross, B et al. "Versatile Video Coding (Draft 7)" (Year: 2019).*
(Continued)

*Primary Examiner* — Philip P. Dang
(74) *Attorney, Agent, or Firm* — Bryan Cave Leighton Paisner LLP

(57) ABSTRACT

A video decoding method performed by a video decoding apparatus, according to the present document, may comprise the steps of: parsing, from a bitstream, number information about the number of slices having heights specifically signaled within a tile of a current picture; on the basis of the number information, parsing, from the bitstream, height information about the heights of the slices having the specifically signaled heights; deriving the number of slices within the tile on the basis of the number information and the height information; generating prediction samples by performing at least one of intra prediction and inter prediction on a current block of the current picture on the basis of the slices within the tile; and generating reconstructed samples on the basis of the prediction samples.

7 Claims, 12 Drawing Sheets

(51) Int. Cl.
*H04N 19/174* (2014.01)
*H04N 19/176* (2014.01)
*H04N 19/70* (2014.01)

(58) Field of Classification Search
CPC .... H04N 19/157; H04N 19/91; H04N 19/103; H04N 19/423
See application file for complete search history.

(56) References Cited

U.S. PATENT DOCUMENTS

| | | | |
|---|---|---|---|
| 2015/0201202 A1 | 7/2015 | Hattori | |
| 2018/0152716 A1* | 5/2018 | Samuelsson | ......... H04N 19/436 |
| 2018/0309987 A1 | 10/2018 | Kim et al. | |
| 2019/0082178 A1* | 3/2019 | Kim | ...................... H04N 19/174 |

FOREIGN PATENT DOCUMENTS

| | | | | |
|---|---|---|---|---|
| EP | 4236315 A2 * | 8/2023 | ........... | H04N 19/107 |
| EP | 3847818 B1 * | 12/2023 | ........... | H04N 19/119 |
| JP | 2014-030187 A | 2/2014 | | |
| KR | 10-2017-0113384 A | 10/2017 | | |
| KR | 10-2018-0004029 A | 1/2018 | | |
| KR | 10-2018-0096831 A | 8/2018 | | |
| KR | 10-2019-0033771 A | 4/2019 | | |
| RU | 2 665 311 C1 | 8/2018 | | |
| WO | 2012/044709 A1 | 4/2012 | | |
| WO | 2015/058718 A1 | 4/2015 | | |
| WO | WO-2016057432 A1 * | 4/2016 | ........... | H04N 19/119 |
| WO | WO-2020008106 A1 * | 1/2020 | ............. | H04N 19/17 |
| WO | WO-2020056357 A1 * | 3/2020 | ........... | H04N 19/119 |

OTHER PUBLICATIONS

Semih Esenlik et al., "AHG12/AHG9: On signalling of rectangular slices", Huawei Technologies Co., Ltd., Joint Video Experts Team (JVET) of ITU-T SG 16 WP 3 and ISO/IEC JTC 1/SC 29/WG 11, 18th Meeting: by teleconference, AT, Apr. 15-24, 2020, Document: JVET-R0209, 517 pages.

Tim Hellman et al., "AHG17: Signalling of Rectangular Slices", Broadcom Inc., Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-O2001-vE.

Benjamin Bross et al., "Versatile Video Coding (Draft 8)", Editors, Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-P0240-v2.

Benjamin Bross et al.: "Versatile Video Coding (Draft 7)", Joint Video Experts Team (JVET) of ITU-T SG 16 WP 3 and ISO/IEC JTC 1/SC 29/WG 11, 16th Meeting: Geneva, CH Oct. 1-11, 2019, Document: JVET-P2001-vE.

Hendry and Seethal Paluri: "[AHG12]: On signaling of multiple rectangular slices in a tile", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q0203.

* cited by examiner

IMAGE/VIDEO CODING METHOD AND APPARATUS

This application is a National Stage Application of International Application No. PCT/KR2020/016884, filed on Nov. 26, 2020, which claims the benefit of and priority to U.S. Provisional Application No. 62/941,862, filed on Nov. 28, 2019, which are hereby incorporated by reference in their entirety for all purposes as if fully set forth herein.

BACKGROUND OF THE DISCLOSURE

Field of the Disclosure

The present disclosure relates to a method and apparatus for coding an image/video.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY OF THE DISCLOSURE

Technical Objects

A technical object of the present disclosure is to provide a method and apparatus for increasing coding efficiency of an image/video.

Another technical object of the present disclosure is to provide a method and apparatus for efficiently signaling information on a slice within a tile.

Yet another technical object of the present disclosure is to provide a method and apparatus for reducing signaling overhead when delivering (or transferring) information on a slice within a tile.

Yet another technical object of the present disclosure is to provide a method and apparatus for efficiently delivering (or transferring) information related to a number and height of slices within a tile.

Yet another technical object of the present disclosure is to provide a method and apparatus for efficiently signaling information related to heights of corresponding slides, when two or more slides have the same height within a tile.

Technical Solutions

According to an embodiment of the present disclosure, provided herein is a video decoding method performed by a video decoding apparatus. The method may include the steps of parsing number information related to a number of slices each having its height explicitly signaled within a tile of a current picture from a bitstream, deriving a number of slices within the tile based on the number information and the height information, generating prediction samples by performing at least one of intra prediction or inter prediction on a current block of the current picture based on the slices within the tile, and generating reconstructed samples based on the prediction samples, wherein the height information may include a same number of syntax elements as a value of the number information, wherein, based on the number information value being equal to n, heights of a 0-th slice to an (n−1)-th slice within the tile may be derived based on the syntax elements, wherein a height of an n-th slice within the tile may be derived based on the height of the (n−1)-th slice, and wherein a height of a last slice within the tile may be derived based on a remaining height after subtracting the heights of other slices within the tile from a height of the tile.

According to another embodiment of the present disclosure, provided herein is a video encoding method performed by a video encoding apparatus. The method may include the steps of deriving slices within a tile of a current picture, generating prediction related information and prediction samples by performing at least one of intra prediction or inter prediction based on the derived slices, generating residual information based on the prediction samples, generating number information related to a number of slices each having its height explicitly signaled within the tile and height information related to heights of the slices each having its height explicitly signaled based on the derived slices, and encoding image information including the prediction related information, the residual information, the number information, and the height information, wherein, based on a value of the number information being equal to n, the height information may indicate heights of a 0-th slice to an (n−1)-th slice within the tile, wherein a height of an n-th slice within the tile may be derived based on the height of the (n−1)-th slice, and wherein a height of a last slice within the tile may be derived based on a remaining height after subtracting the heights of other slices within the tile from a height of the tile.

According to yet another embodiment of the present disclosure, provided herein is a computer readable digital recording medium having information stored therein that causes a video decoding method to be performed by a video decoding apparatus. The video decoding method may include the steps of parsing number information related to a number of slices each having its height explicitly signaled within a tile of a current picture from image information, parsing height information related to heights of slices each having its height explicitly signaled from the image information based on the number information, deriving a number of slices within the tile based on the number information and the height information, generating prediction samples by performing at least one of intra prediction or inter prediction on a current block of the current picture based on the slices within the tile, and generating reconstructed samples based on the prediction samples, wherein the height information may include a same number of syntax elements as a value of the number information, wherein, based on the number information value being equal to n, heights of a 0-th slice to an (n−1)-th slice within the tile may be derived based on the syntax elements, wherein a height of an n-th slice within the tile may be derived based on the height of the (n−1)-th slice, and wherein a height of a last slice within the tile may be derived based on a remaining height after subtracting the heights of other slices within the tile from a height of the tile.

Effects of the Disclosure

According to an embodiment of the present disclosure, overall compression efficiency of an image/video may be enhanced.

According to an embodiment of the present disclosure, information on a slice within a tile may be efficiently signaled.

According to an embodiment of the present disclosure, signaling overhead may be reduced when delivering (or transferring) information on a slice within a tile.

According to an embodiment of the present disclosure, information related to a number and height of slices within a tile may be efficiently signaled.

According to an embodiment of the present disclosure, when two or more slides have the same height within a tile, signaling of the slides having the same height may be skipped.

DESCRIPTION OF EXEMPLARY EMBODIMENTS

Figure 1:
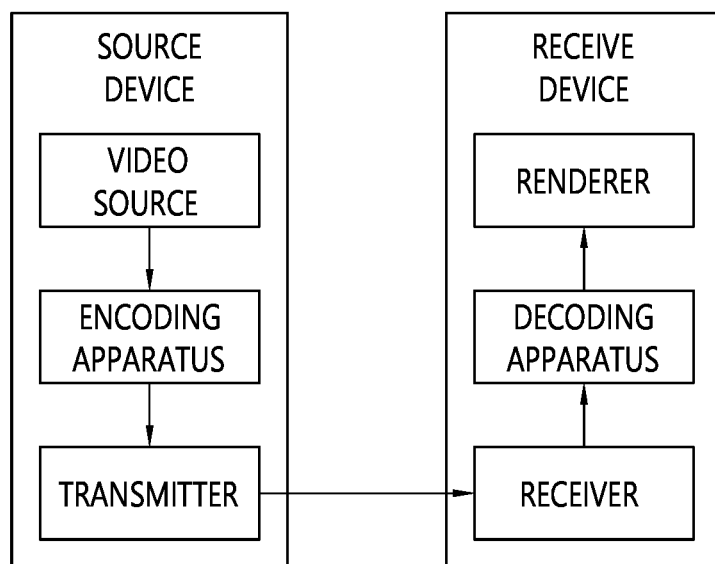
FIG. 1 schematically illustrates an example of a video/image coding system to which embodiments of the present document are applicable.

The disclosure of the present document may be modified in various forms, and specific embodiments thereof will be described and illustrated in the drawings. The terms used in the present document are used to merely describe specific embodiments, but are not intended to limit the disclosed method in the present document. An expression of a singular number includes an expression of 'at least one', so long as it is clearly read differently. The terms such as "include" and "have" are intended to indicate that features, numbers, steps, operations, elements, components, or combinations thereof used in the document exist and it should be thus understood that the possibility of existence or addition of one or more different features, numbers, steps, operations, elements, components, or combinations thereof is not excluded.

The present document relates to video/image coding. For example, a method/embodiment disclosed in the present document may be applied to a method disclosed in a versatile video coding (VVC) standard. In addition, the method/embodiment disclosed in the present document may be applied to a method disclosed in an essential video coding (EVC) standard, AOMedia Video 1 (AV1) standard, 2nd generation of audio video coding standard (AVS2), or a next-generation video/image coding standard (e.g., H.267, H.268, etc.).

Various embodiments related to video/image coding are presented in the present document, and the embodiments may be combined with each other unless otherwise stated.

In addition, each configuration of the drawings described in the present document is an independent illustration for explaining functions as features that are different from each other, and does not mean that each configuration is implemented by mutually different hardware or different software. For example, two or more of the configurations may be combined to form one configuration, and one configuration may also be divided into multiple configurations. Without departing from the gist of the disclosed method of the present document, embodiments in which configurations are combined and/or separated are included in the scope of the disclosure of the present document.

In the present document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present document should be interpreted to indicate "additionally or alternatively."

Further, the parentheses used in the present document may mean "for example". Specifically, in case that "prediction (intra prediction)" is expressed, it may be indicated that "intra prediction" is proposed as an example of "prediction". In other words, the term "prediction" in the present document is not limited to "intra prediction", and "intra prediction" is proposed as an example of "prediction". Further, even in case that "prediction (i.e., intra prediction)" is expressed, it may be indicated that "intra prediction" is proposed as an example of "prediction".

In the present document, technical features individually explained in one drawing may be individually implemented or simultaneously implemented.

Hereinafter, embodiments of the present document will be described in detail with reference to the accompanying drawings. In addition, like reference numerals are used to indicate like elements throughout the drawings, and the same descriptions on the like elements may be omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture). A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture). A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, tile group and slice may be used interchangeably. For example, in the present document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

Figure 2:
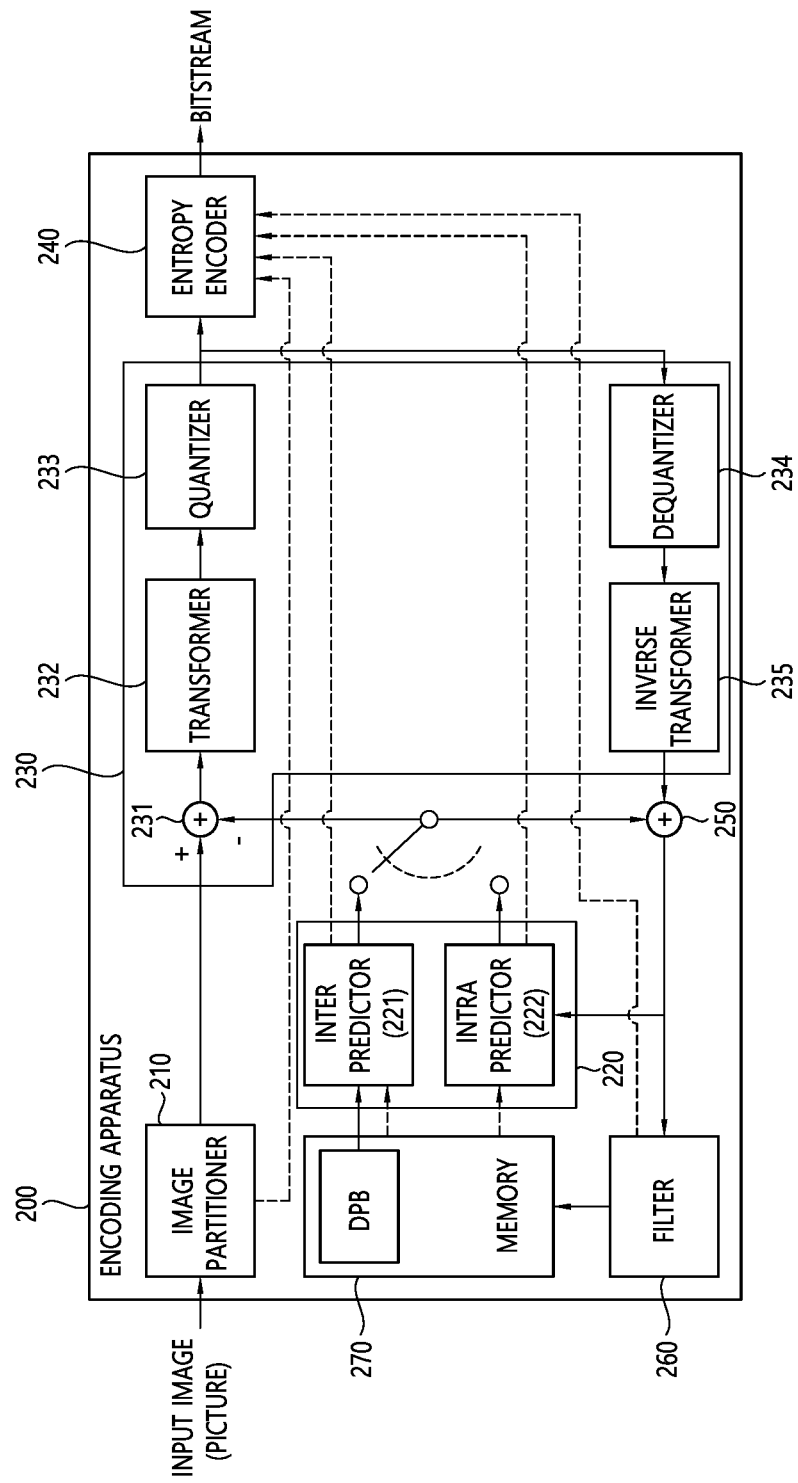
FIG. 2 is a diagram schematically illustrating a configuration of a video/image encoding apparatus to which the embodiments of the present document are applicable.

FIG. 2 is a diagram schematically illustrating the configuration of a video/image encoding apparatus to which the embodiments of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor 220 may perform prediction on a processing target block (hereinafter, referred to as a current block) and generate a predicted block including prediction samples for the current block. The predictor 220 may determine whether intra prediction or inter prediction is applied in units of a current block or CU. The predictor 220 may generate various kinds of information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor 220 may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in the present document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal.

The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form.

The entropy encoder 240 may perform various encoding methods such as, for example, exponential Golomb, context-adaptive variable length coding (CAVLC), and context-adaptive binary arithmetic coding (CABAC). The entropy encoder 240 may encode information necessary for video/image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In the present document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
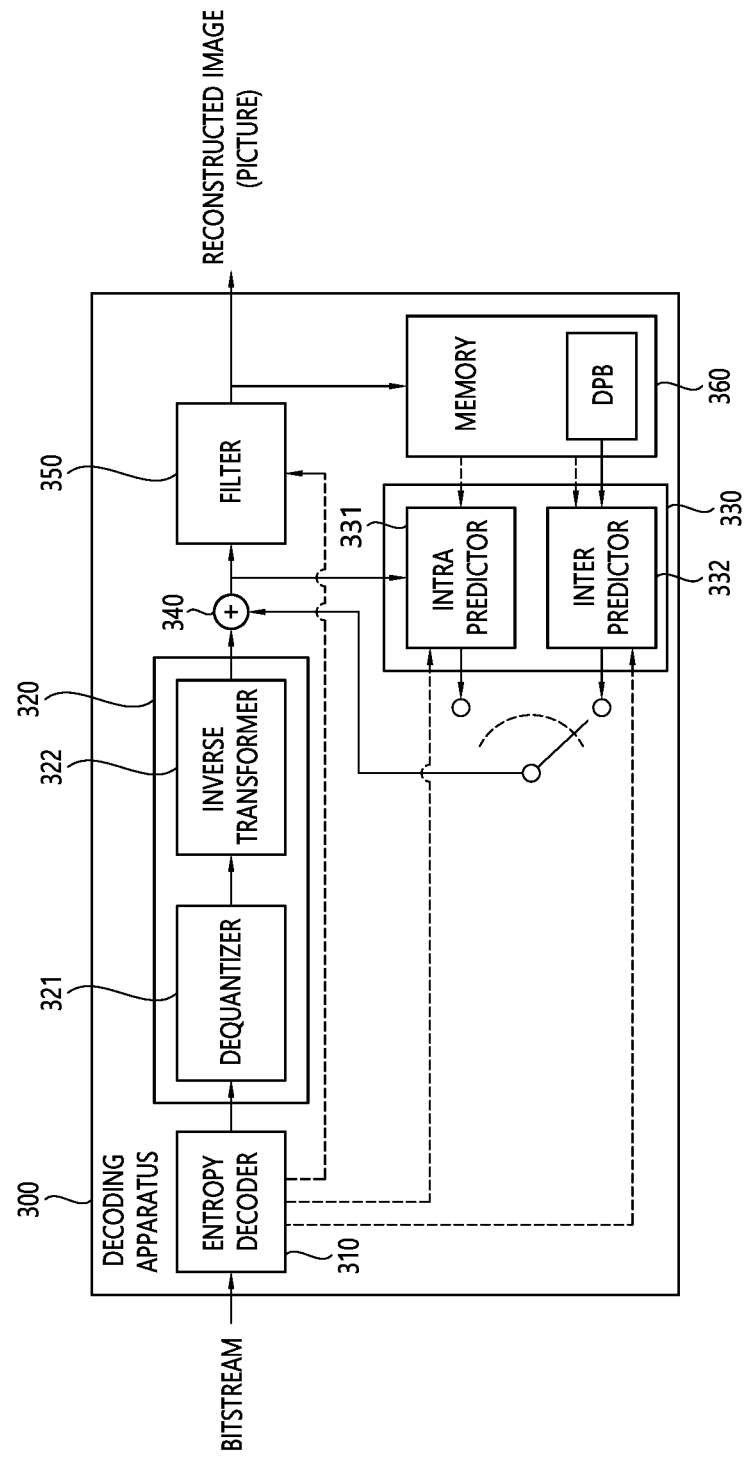
FIG. 3 is a diagram schematically illustrating a configuration of a video/image decoding apparatus to which the embodiments of the present document are applicable.

FIG. 3 is a diagram for schematically explaining the configuration of a video/image decoding apparatus to which the embodiments of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (inter predictor 332 and intra predictor 331), and residual values on which the entropy decoding has been performed in the entropy decoder 310, that is, the quantized transform coefficients and related parameter information, may be input to the residual processor 320.

The residual processor 320 may derive a residual signal (residual block, residual samples, or residual sample array). Also, information on filtering among the information decoded by the entropy decoder 310 may be provided to the filter 350. Meanwhile, a receiving unit (not shown) for receiving a signal output from the encoding apparatus may be further configured as an internal/external element of the decoding apparatus 300, or the receiving unit may be a component of the entropy decoder 310. Meanwhile, the decoding apparatus according to the present document may be called a video/image/picture decoding apparatus, and the decoding apparatus may be divided into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, an inter predictor 332, and an intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In the present document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of the present document as well.

The predictor 330 may perform the prediction of the current block, and generate a predicted block including the prediction samples of the current block. The predictor may determine whether the intra prediction is applied or the inter prediction is applied to the current block based on the information on prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in the present document. The palette mode may be considered as an example of intra coding or intra prediction. When the palette mode is applied, information on the palette table and the palette index may be included in the video/image information and signaled.

The intra predictor 331 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In the present document, the embodiments described in the filter 260, the inter predictor 221, and the intra predictor 222 of the encoding apparatus 200 may be applied equally or to correspond to the filter 350, the inter predictor 332, and the intra predictor 331.

Meanwhile, the video/image coding method according to the present document may be performed based on the following partitioning structure. Specifically, above described procedures of prediction, residual processing ((inverse) transform and (de)quantization), syntax element coding, and filtering may be performed based on CTU and CU (and/or TU and PU) derived based on the partitioning structure. A block partitioning procedure may be performed by the image partitioner 210 of the above-described encoding apparatus, and partitioning-related information may be (encoding) processed by the entropy encoder 240, and may be transferred to the decoding apparatus in the form of a bitstream. The entropy decoder 310 of the decoding apparatus may derive the block partitioning structure of the current picture based on the partitioning-related information obtained from the bitstream, and based on this, may perform a series of procedures (e.g., prediction, residual processing, block/picture reconstruction, in-loop filtering, and the like) for image decoding. The CU size and the TU size may be equal to each other, or a plurality of TUs may be present within a CU region. Meanwhile, the CU size may generally represent a luma component (sample) coding block (CB) size. The TU size may generally represent a luma component (sample) transform block (TB) size. The chroma component (sample) CB or TB size may be derived based on the luma component (sample) CB or TB size in accordance with a component ratio according to a color format (chroma format, e.g., 4:4:4, 4:2:2, 4:2:0 and the like) of a picture/image. The TU size may be derived based on maxTbSize. For example, if the CU size is larger than the maxTbSize, a plurality of TUs (TBs) of the maxTbSize may be derived from the CU, and the transform/inverse transform may be performed in the unit of TU (TB). Further, for example, in case that intra prediction is applied, the intra prediction mode/type may be derived in the unit of CU (or CB), and neighboring reference sample derivation and prediction sample generation procedures may be performed in the unit of TU (or TB). In this case, one or a plurality of TUs (or TBs) may be present in one CU (or CB) region, and in this case, the plurality of TUs (or TBs) may share the same intra prediction mode/type.

Further, in the video/image coding according to the present document, an image processing unit may have a hierarchical structure. One picture may be partitioned into one or more tiles, bricks, slices, and/or tile groups. One slice may include one or more bricks. On brick may include one or more CTU rows within a tile. The slice may include an integer number of bricks of a picture. One tile group may include one or more tiles. One tile may include one or more CTUs. The CTU may be partitioned into one or more CUs. A tile represents a rectangular region of CTUs within a particular tile column and a particular tile row in a picture. A tile group may include an integer number of tiles according to a tile raster scan in the picture. A slice header may carry information/parameters that can be applied to the corresponding slice (blocks in the slice). In case that the encoding/decoding apparatus has a multi-core processor, encoding/decoding processes for the tiles, slices, bricks, and/or tile groups may be processed in parallel. In the present document, the slice or the tile group may be used exchangeably. That is, a tile group header may be called a slice header. Here, the slice may have one of slice types including intra (I) slice, predictive (P) slice, and bi-predictive (B) slice. In predicting blocks in I slice, inter prediction may not be used, and only intra prediction may be used. Of course, even in this case, signaling may be performed by coding the original sample value without prediction. With respect to blocks in P slice, intra prediction or inter prediction may be used, and in case of using the inter prediction, only uni-prediction can be used. Meanwhile, with respect to blocks in B slice, the intra prediction or inter prediction may be used, and in case of using the inter prediction, up to bi-prediction can be maximally used.

The encoding apparatus may determine the tile/tile group, brick, slice, and maximum and minimum coding unit sizes in consideration of the coding efficiency or parallel processing, or according to the characteristics (e.g., resolution) of a video image, and information for them or information capable of inducing them may be included in the bitstream.

The decoding apparatus may obtain information representing the tile/tile group, brick, and slice of the current picture, and whether the CTU in the tile has been partitioned into a plurality of coding units. By making such information be obtained (transmitted) only under a specific condition, the efficiency can be enhanced.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. The slice header (slice header syntax) may include information/parameters that may be commonly applied to the slice. An adaptation parameter set (APS) or a picture parameter set (PPS) may include information/parameters that may be commonly applied to one or more slices or pictures. A sequence parameter set (SPS) may include information/parameters that may be commonly applied to one or more sequences. A video parameter set (VPS) may include information/parameters that may be commonly applied to multiple layers. A decoding parameter set (DPS) may include information/parameters that may be commonly applied to the overall video. The DPS may include information/parameters related to concatenation of a coded video sequence (CVS).

A high level syntax (HLS) in the present disclosure include at least one of the APS syntax, the PPS syntax, the SPS syntax, the VPS syntax, the DPS syntax, and the slice header syntax.

Additionally, for example, information on the partitioning and configuration, and so on, of a tile/tile group/brick/slice may be configured in an encoding apparatus based on the high level syntax and may then be delivered (or transferred) to a decoding apparatus in a bitstream format.

A picture may be partitioned to one or more tile rows and one or more tile columns A tile is a sequence of CTUs covering a rectangular region of a picture. A tile may be partitioned to one or more bricks, and each brick may be configured of multiple CTU rows. A tile that is not partitioned to a plurality of bricks may also be referred to as a brick. However, a brick being a subset of a tile is not referred to as a tile. A slice may include multiple tiles or multiple bricks of a tile.

A(n) video/image encoding procedure that is based on intra prediction may generally include, for example, the following.

Figure 4:
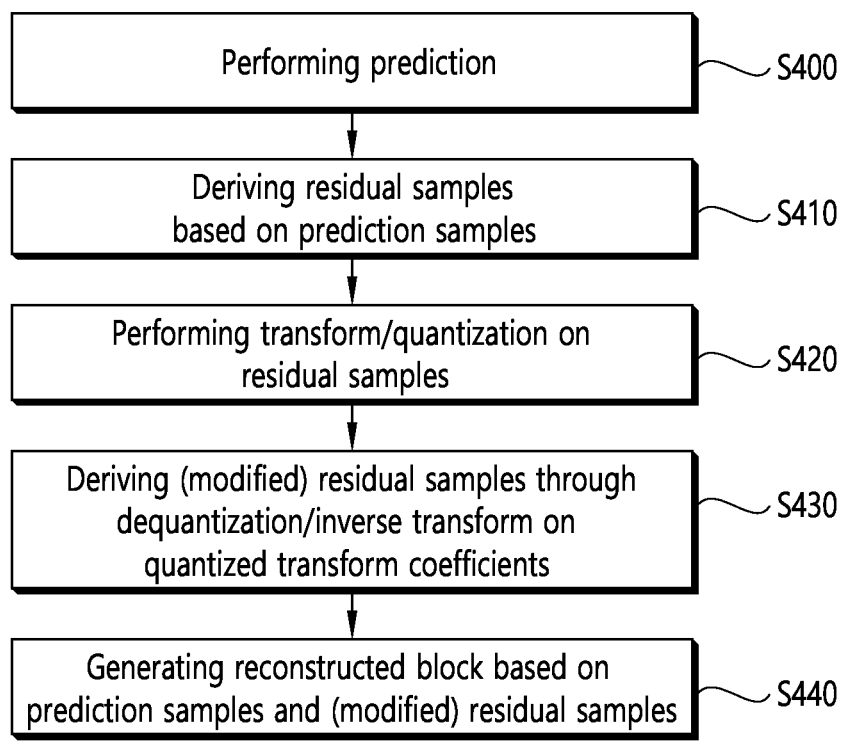
FIG. 4 shows an example of an intra prediction based video/image encoding method.

FIG. 4 shows an example of an intra prediction based video/image encoding method.

Referring to FIG. 4, S400 may be performed by the intra predictor 222 of the encoding apparatus, and S410 to S430 may be performed by the residual processor 230 of the encoding apparatus. More specifically, S410 may be performed by the subtractor 231 of the encoding apparatus, S420 may be performed by the transformer 232 and the quantizer 233 of the encoding apparatus, and S430 may be performed by the dequantizer 234 and the inverse transformer 235 of the encoding apparatus. In S400, prediction information may be derived by the intra predictor 222 and may be encoded by the entropy encoder 240. Residual information may be derived through S410 and S420, and the residual information may then be encoded by the entropy encoder 240. The residual information is information related to the residual samples. The residual information may include information related to quantized transform coefficients for the residual samples. As described above, the residual samples may be derived as transform coefficients through the transformer 232 of the encoding apparatus, and the transform coefficients may be derived as quantized transform coefficients through the quantizer 233. Information related to the quantized transform coefficients may be encoded in the entropy encoder 240 through a residual coding procedure.

The encoding apparatus performs intra prediction on a current block (S400). The encoding apparatus derives an intra prediction mode for the current block and may derive neighboring reference samples of the current block, and, then, the encoding apparatus generates prediction samples within the current block based on the intra prediction mode and the neighboring reference samples. Herein, the procedures of determining the intra prediction mode, deriving neighboring reference samples, and generating prediction samples may all be performed simultaneously, or any one of the above-mentioned procedures may be performed before the other procedure(s). For example, the intra predictor 222 of the encoding apparatus may include a prediction mode/type determining unit, a reference sample deriving unit, and a prediction sample deriving unit. The prediction mode/type determining unit may determine an intra prediction mode/type for the current block, the reference sample deriving unit may derive neighboring reference samples of the current block, and the prediction sample deriving unit may derive motion samples of the current block. Meanwhile, when a prediction sample filtering procedure, which will hereinafter be described, is performed, the intra predictor 222 may further include a prediction sample filter. The encoding apparatus may determine a mode that is applied to the current block, among a plurality of intra prediction modes. The encoding apparatus may compare rate-distortion (RD)

costs for the intra prediction modes and determine an optimal intra prediction mode for the current block.

Meanwhile, the encoding apparatus may perform a prediction sample filtering procedure. Prediction sample filtering may also be referred to as post filtering. Among the prediction samples, part or all of the prediction samples may be filtered by the prediction sample filtering procedure. In some cases, the prediction sample filtering procedure may be skipped.

The encoding apparatus derives residual samples for the current block based on the prediction samples (S410). The encoding apparatus performs a phase-based comparison of the prediction samples from the original samples of the current block, and, then, the encoding apparatus may derive the residual samples.

The encoding apparatus may derive quantized transform coefficients by transforming/quantizing the residual samples (S420). Thereafter, the encoding apparatus may derive (modified) residual samples by performing dequantization/inverse transform processing once again on the quantized transform coefficients (S430). As described above, the reason for performing dequantization/inverse transform once again after performing transform/quantization is to derive the same residual samples as the residual samples that are derived in the decoding apparatus.

The encoding apparatus may generate a reconstructed block including reconstructed samples for the current block based on the prediction samples and the (modified) residual samples (S440). A reconstructed picture for the current picture may be generated based on the reconstructed block.

As described above, the encoding apparatus may encode image information including prediction information related to the intra prediction (e.g., prediction mode information indicating a prediction mode) and residual information related to the intra/the residual samples and, then, output the encoded image information in a bitstream format. The residual information may include a residual coding syntax. The encoding apparatus may derive quantized transform coefficients by transforming/quantizing the residual samples. The residual information may include information on the quantized transform coefficients.

A(n) video/image decoding procedure that is based on intra prediction may generally include, for example, the following.

Figure 5:
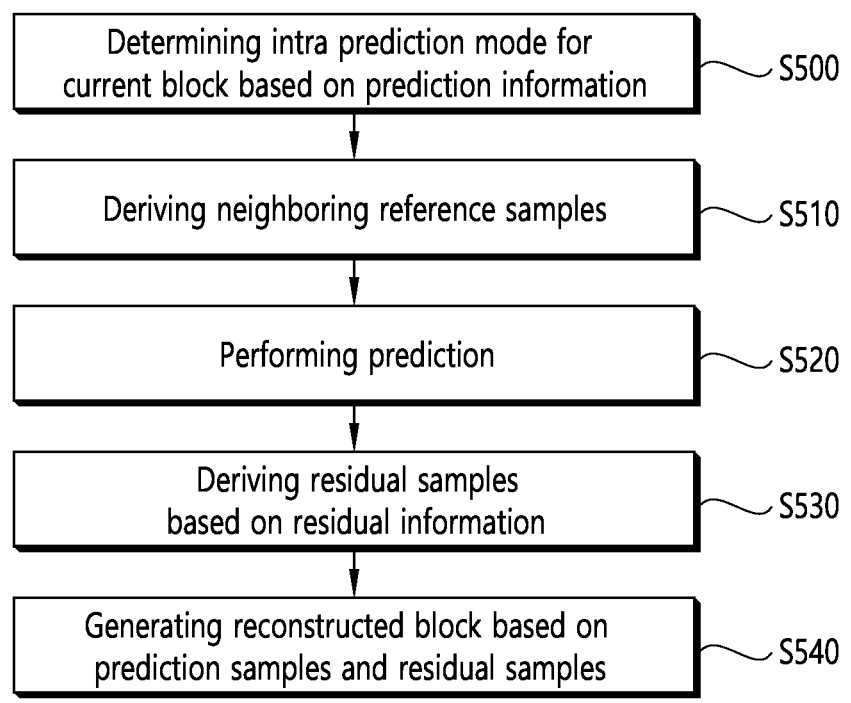
FIG. 5 shows an example of an intra prediction based video/image decoding method.

FIG. 5 shows an example of an intra prediction based video/image decoding method.

A decoding apparatus may perform operations that correspond to the operations performed by the encoding apparatus.

Referring to FIGS. 5, S500 to S510 may be performed by the intra predictor 331 of the decoding apparatus, and prediction information of S500 and residual information of S530 may be obtained from a bitstream by the entropy decoder 310 of the decoding apparatus. The residual processor 320 of the decoding apparatus may derive residual samples for a current block based on the residual information. More specifically, the dequantizer 321 of the residual processor 320 may derive transform coefficients by performing dequantization, based on the quantized transform coefficients that are derived based on the residual information. And, the inverse transformer 322 of the residual processor may derive residual samples for the current block by performing inverse transform on the transform coefficients. S540 may be performed by the adder 340 or reconstructor of the decoding apparatus.

More specifically, the decoding apparatus may derive an intra prediction mode for a current block based on received prediction information (S500). The decoding apparatus may derive neighboring reference samples of the current block (S510). The decoding apparatus may generate prediction samples within the current block by performing intra prediction based on the intra prediction mode and the neighboring reference samples (S520). In this case, the decoding apparatus may perform a prediction sample filtering procedure. Prediction sample filtering may be referred to as post filtering. Among the prediction sample, part or all of the prediction samples may be filtered by the prediction sample filtering procedure. In some cases, the prediction sample filtering procedure may be skipped.

The decoding apparatus generates residual samples for the current block based on the received residual information (S530). The decoding apparatus may generate reconstructed samples for the current block based on the prediction samples and the residual samples and may derive a reconstructed block including the reconstructed samples (S540). A reconstructed picture for the current picture may be generated based on the reconstructed block.

Herein, the intra predictor 331 of the decoding apparatus may include a prediction mode/type determining unit, a reference sample deriving unit, and a prediction sample deriving unit. The prediction mode/type determining unit may determine an intra prediction mode for the current block based on the prediction mode information that is obtained by the entropy decoder 310 of the decoding apparatus, the reference sample deriving unit may derive neighboring reference samples of the current block, and the prediction sample deriving unit may derive prediction samples of the current block. Meanwhile, when the above-described prediction sample filtering procedure is performed, the intra predictor 331 may further include a prediction sample filter.

The prediction information may include intra prediction mode information and/or intra prediction type information. The intra prediction mode information may, for example, include flag information (e.g., intra_luma_mpm_flag) indicating whether or a most probable mode (MPM) is applied to the current block or whether a remaining mode is applied to the current block. And, when the MPM is applied to the current block, the prediction mode information may further include index information (e.g., intra_luma_mpm_idx) indicating one of the intra prediction mode candidates (MPM candidates). The intra prediction mode candidates (MPM candidates) may be configured of an MPM candidate list or an MPM list. Additionally, when the MPM is not applied to the current block, the intra prediction mode information may further include remaining mode information (e.g., intra_luma_mpm_remainder) indicating one of the remaining intra prediction modes excluding the intra prediction mode candidates (MPM candidates). The decoding apparatus may determine an intra prediction mode of the current block based on the intra prediction mode information. For the above-described MIP, a separate MPM list may be configured.

Additionally, the intra prediction type information may be implemented in various formats. For example, the intra prediction type information may include intra prediction type index information indicating one of the intra prediction types. As another example, the intra prediction type information may include at least one of reference sample line information (e.g., intra_luma_ref_idx) indicating whether or not the MRL is applied to the current block and which n-th reference sample line is being applied, when the MRL is applied to the current block, ISP flag information (e.g., intra_subpartitions_mode_flag) indicating whether or not the ISP is applied to the current block, ISP type information (e.g., intra_subpartitions_split_flag) indicating split (or partitioning) type of subpartitions, when the ISP is applied to the current block, flag information indicating whether or not PDCP is applied, or flag information indicating whether or not LIP is applied. Furthermore, the intra prediction type information may include an MIP flag indicating whether or not MIP is applied to the current block.

The intra prediction mode information and/or the intra prediction type information may be encoded/decoded by using the coding method that is described in the present specification. For example, the intra prediction mode information and/or the intra prediction type information may be encoded/decoded by using entropy coding (e.g., CABAC, CAVLC) based on a truncated (rice) binary code.

Meanwhile, a(n) video/image encoding procedure that is based on inter prediction may generally include, for example, the following.

Figure 6:
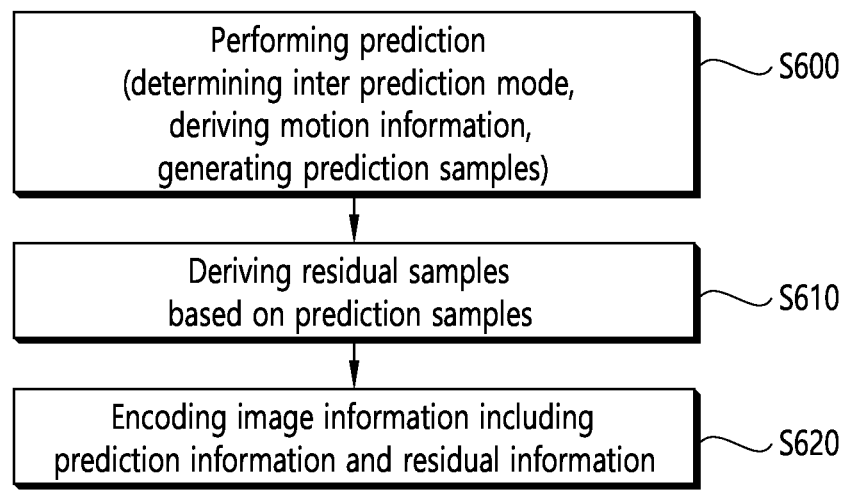
FIG. 6 shows an example of an inter prediction based video/image encoding method.

FIG. 6 shows an example of an inter prediction based video/image encoding method.

Referring to FIG. 6, the encoding apparatus performs inter prediction on a current block (S600). The encoding apparatus may derive an inter prediction mode and motion information of the current block and generate prediction samples of the current block. Herein, the procedures of determining the inter prediction mode, deriving motion information, and generating prediction samples may all be performed simultaneously, or any one of the above-mentioned procedures may be performed before the other procedure(s). For example, the inter predictor of the encoding apparatus may include a prediction mode determining unit, a motion information deriving unit, and a prediction sample deriving unit. The prediction mode determining unit may determine a prediction mode for the current block, the motion information deriving unit may derive motion information of the current block, and the prediction sample deriving unit may derive prediction samples of the current block. For example, the inter predictor of the encoding apparatus may search for a block that is similar to the current block within a predetermined region (search region) of reference pictures through motion estimation, and, then, the inter predictor of the encoding apparatus may derive a reference block having minimum difference from the current block or having a difference from the current block that is equal to or below a predetermined reference standard. Based on such difference, a reference picture index indicating a reference picture in which the reference block is located may be derived, and a motion vector may be derived based on a position difference between the reference block and the current block. The encoding apparatus may determine a mode that is applied to the current block, among various prediction modes. The encoding apparatus may compare rate-distortion (RD) costs for the various prediction modes and determine an optimal prediction mode for the current block.

For example, when a skip mode or merge mode is applied to the current block, the encoding apparatus configures a merge candidate list, and, among the reference blocks that are indicated by the merge candidates included in the merge candidate list, a reference block having minimum difference from the current block or having a difference from the current block that is equal to or below a predetermined reference standard may be derived. In this case, a merge candidate that is associated with the derived reference block may be selected, and merge index information indicating the selected merge candidate may be generated and then signaled to the decoding apparatus. Motion information of the current block may be derived by using motion information of the selected merge candidate.

As another example, when an (A)MVP mode is applied to the current block, the encoding apparatus configures an (A)MVP candidate list, and a motion vector of a selected motion vector predictor (mvp) candidate, which is selected from mvp candidates that are included in the (A)MVP candidate list, may be used as the mvp of the current block. In this case, for example, the motion vector indicating a reference block that is derived by the above-described motion estimation may be used as the motion vector of the current block, and, among the mvp candidates, an mvp candidate having a motion vector that has the smallest difference from the motion vector of the current block may be the selected mvp candidate. A motion vector difference (MVD), which is a difference that is obtained by subtracting the mvp from the motion vector of the current block, may be derived. In this case, information related to the MVD may be signaled to the decoding apparatus. Additionally, when the (A)MVP mode is applied, a value of the reference picture index may be configured of reference picture index information and may be separately signaled to the decoding apparatus.

The encoding apparatus may derive residual samples based on the prediction samples (S610). The encoding apparatus may derive the residual samples by comparing the prediction samples with original samples of the current block.

The encoding apparatus encodes image information including prediction information and residual information (S620). The encoding apparatus may output the encoded image information in a bitstream format. The prediction information may be information related to the prediction procedure that may include prediction mode information (e.g., skip flag, merge flag or mode index, and so on) and information related to motion information. The information related to the motion information may include candidate selection information (e.g., merge index, mvp flag or mvp index), which is information for deriving a motion vector. Additionally, the information related to the motion information may include the above-described information on the MVD and/or reference picture index information. Additionally, the information related to the motion information may include information indicating whether L0 prediction, L1 prediction, or bi-prediction is applied. The residual information is information related to the residual samples. The residual information may include information related to quantized transform coefficients for the residual samples.

The outputted bitstream may be stored in a (digital) storage medium and then delivered to the decoding apparatus, or the outputted bitstream may be delivered to the decoding apparatus through a network.

Meanwhile, the above-described encoding apparatus may generate a reconstructed picture (including reconstructed samples and reconstructed block) based on the reference samples and the residual samples. This is performed so that the encoding device can derive a prediction result that is the same as the prediction result obtained by the prediction procedure performed in the decoding apparatus and, also, because the coding efficiency may be enhanced accordingly. Therefore, the encoding apparatus may store a reconstructed picture (or reconstructed samples, reconstructed block) in a memory and may use the stored picture as a reference picture for inter prediction. As described above, an in-loop filtering procedure, and so on, may be further applied to the reconstructed picture.

A(n) video/image decoding procedure that is based on inter prediction may generally include, for example, the following.

Figure 7:
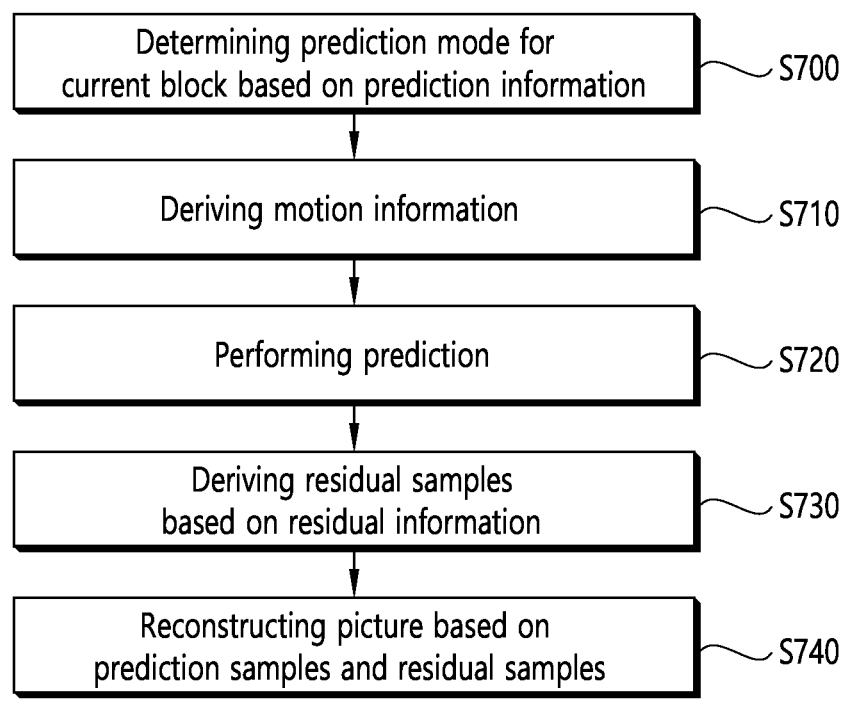
FIG. 7 shows an example of an inter prediction based video/image decoding method.

FIG. 7 shows an example of an inter prediction based video/image decoding method.

A decoding apparatus may perform operations that correspond to the operations performed by the encoding apparatus. The decoding apparatus may perform prediction on a current block based on the received prediction information and may derive prediction samples.

More specifically, referring to FIG. 7, the decoding apparatus may determine a prediction mode for the current block based on prediction information received from a bitstream (S700). The decoding apparatus may determine which inter prediction mode is applied to the current block based on prediction mode information within the prediction information.

For example, whether nor not a merge mode is applied to the current block or whether or not an (A)MVP mode is determined may be determined based on a merge flag. Alternatively, one inter prediction mode candidate may be selected, from various inter prediction mode candidates, based on the merge index. The inter prediction mode candidates may include various inter prediction modes, such as a skip mode, a merge mode, and/or an (A)MVP mode, and so on.

The decoding apparatus derives motion information of the current block based on the determined inter prediction mode (S710). For example, when a skip mode or merge mode is applied to the current block, the decoding apparatus configures a merge candidate list, which will be described later on in detail, and may select one merge candidate from the merge candidates included in the merge candidate list. The selection may be performed based on the above-described merge index. Motion information of the current block may be derived by using motion information of the selected merge candidate. The motion information of the selected merge candidate may be used as the motion information of the current block.

As another example, when an (A)MVP mode is applied to the current block, the decoding apparatus configures an (A)MVP candidate list, and a motion vector of a selected motion vector predictor (mvp) candidate, which is selected from mvp candidates that are included in the (A)MVP candidate list, may be used as the mvp of the current block. The selection may be performed based on the above-described selection information (mvp flag or mvp index). And, in this case, an MVD of the current block may be derived based on information on the MVD, and a motion vector of the current block may be derived based on the mvp of the current block and the MVD. Additionally, a reference picture index of the current block may be derived based on the reference picture index information. A picture that is indicated by the reference picture index within a reference picture list related to the current block may be derived as a reference picture that is being referred to for the inter prediction of the current block.

Meanwhile, the motion information of the current block may be derived without configuring any candidate list, and, in this case, the above-described candidate list configuration may be skipped.

The decoding apparatus may generate prediction samples for the current block based on the motion information of the current block (S720). In this case, the decoding apparatus may derive the reference picture based on a reference picture index of the current block, and, then, the decoding apparatus may derive prediction samples of the current block by using samples of a reference block that is indicated by the motion vector of the current block within the reference picture. In this case, among the prediction samples of the current block, a prediction sample filtering procedure, which will be described later on in more detail, may be further performed on all or part of the prediction samples of the current block.

For example, the inter predictor of the decoding apparatus may include a prediction mode determining unit, a motion information deriving unit, and a prediction sample deriving unit. The prediction mode determining unit may determine a prediction mode for the current block based on received prediction mode information, the motion information deriving unit may derive motion information (motion vector and/or reference picture index, and so on) of the current block based on information on the received motion information, and the prediction sample deriving unit may derive prediction samples of the current block.

The decoding apparatus generates residual samples for the current block based on the received residual information (S730). The decoding apparatus may generate reconstructed samples for the current block based on the prediction samples and the residual samples and generate a reconstructed picture based on the generated reconstructed samples (S740). Thereafter, as described above, an in-loop filtering procedure, and so on, may be further applied to the reconstructed picture.

Meanwhile, as described above, a high level syntax (HLS) may be coded/signaled for video/image coding. A coded picture may be configured of one or more slices. A parameter describing the coded picture is signaled within a picture header, and a parameter describing a slice is signaled within a slice header. The picture header is carried in its own NAL unit format. And, the slice header is present at a beginning (or starting point) of a NAL unit including a payload of the slice (i.e., slice data).

Each picture is associated with a picture header. A picture may be configured of different types of slices (an intra-coded slice (i.e., I slice) and inter-coded slices (i.e., P slice and B slice)). Therefore, a picture header may include syntax elements that are needed in an intra slice of a picture and an inter slice of a picture.

A picture may be partitioned to (or divided into) sub-pictures, tiles, and/or slices. Sub-picture signaling may be present in a sequence parameter set (SPS). And, tile and square slice signaling may be present in a picture parameter set (PPS). Raster-scan slice signaling may be present in a slice header.

For example, in relation to the partitioning of a picture, syntax elements shown below in Table 1 may be included in an SPS syntax.

TABLE 1

| | Descriptor |
|---|---|
| seq_parameter_set_rbsp( ) { | |
| ... | |
| subpics_present_flag | u(1) |
| if( subpics_present_flag ) { | |
| sps_num_subpics_minus1 | u(8) |
| for( i = 0; i <= sps_num_subpics_minus1; i++ ) { | |
| subpic_ctu_top_left_x[ i ] | u(v) |
| subpic_ctu_top_left_y[ i ] | u(v) |
| subpic_width_minus1[ i ] | u(v) |

TABLE 1-continued

| | Descriptor |
|---|---|
| subpic_height_minus1[ i ] | u(v) |
| subpic_treated_as_pic_flag[ i ] | u(1) |
| loop_filter_across_subpic_enabled_flag[ i ] | u(1) |
| } | |
| } | |
| ... | |
| } | |

Syntax elements shown below in Table 2 may be included in a PPS syntax.

TABLE 2

| | Descriptor |
|---|---|
| pic_parameter_set_rbsp( ) { | |
| ... | |
| no_pic_partition_flag | u(1) |
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   rect_slice_flag | u(1) |
|   if( rect_slice_flag ) | |
|     single_slice_per_subpic_flag | u(1) |
|   if( rect_slice_flag && !single_slice_per_subpic_flag ) { | |
|     num_slices_in_pic_minus1 | ue(v) |
|     tile_idx_delta_present_flag | u(1) |
|     for( i = 0; i < num_slices_in_pic_minus1; i++ ) { | |
|       slice_width_in_tiles_minus1[ i ] | ue(v) |
|       slice_height_in_tiles_minus1[ i ] | ue(v) |
|       if( slice_width_in_tiles_minus1[ i ] = = 0 && | |
|         slice_height_in_tiles_minus1[ i ] = = 0 ) { | |
|         num_slices_in_tile_minus1[ i ] | ue(v) |
|         numSlicesInTileMinus1 = num_slices_in_tile_minus1[ i ] | |
|         for( j = 0, j < numSlicesInTileMinus1; j++ ) | |
|           slice_height_in_ctu_minus1[ i++ ] | ue(v) |
|       } | |
|       if( tile_idx_delta_present_flag && i < num_slices_in_pic_minus1 ) | |
|         tile_idx_delta[ i ] | se(v) |
|     } | |
|   } | |
|   loop_filter_across_tiles_enabled_flag | u(1) |
|   loop_filter_across_slices_enabled_flag | u(1) |
| } | |
| ... | |
| } | |

In Table 2, num_slices_in_tile_minus1[i]+1 indicates a number of slices within a current tile, when an i-th slice includes a subset of CTU rows in a single tile. A value of num_slices_in_tile_minus1[i] should be within a range inclusive of 0 to RowHeight[tileY]−1. Herein, tileY is an index of a tile row including an i-th slice. When num_slices_in_tile_minus1[i] is not present in a PPS, the value of num_slices_in_tile_minus1[i] is derived as 0.

slice_height_in_ctu_minus1[i]+1 indicates a height of an i-th rectangular slice in CTU row units, when an i-th slice includes a subset of CTU rows in a single tile. A value of slice_height_in_ctu_minus1[i] should be within a range inclusive of 0 to RowHeight[tileY]−1. Herein, tileY is an index of a tile row including an i-th slice.

Syntax elements shown below in Table 3 may be included in a slice header syntax.

TABLE 3

| | Descriptor |
|---|---|
| slice_header( ) { | |
| ... | |
| if( rect_slice_flag || NumTilesInPic > 1 ) | |
|   slice_address | u(v) |
| if( !rect_slice_flag && NumTilesInPic > 1 ) | |
|   num_tiles_in_slice_minus1 | ue(v) |
| ... | |
| } | |

Referring to Table 1 to Table 3, in the current tile and slice design, a rectangular slice may include one or more tiles. Alternatively, a rectangular slice may include an integer number (or whole number) of CTU rows within a single tile.

When a rectangular slice includes an integer number (or whole number) of CTU rows within a single tile (this corresponds to a case where the tile is partitioned to two or more slices), in the current signaling, the height of each slice is explicitly signaled. However, this type of signaling is not an optimal signaling method.

A layout of slices within one tile may include a case where the heights of the slices within the tile are uniform with the exception for the last slice and a case where the heights of the slices within the tile are not uniform. When the heights of the slices within the tile are uniform with the exception for the last slice, since the heights of all slices excluding the last slice within the tile are the same, only the height of one slice may be simply signaled without having to explicitly signal the height of each slice. When the heights of the slices within the tile are not uniform, the height of each slice within the tile needs to be signaled.

The following drawings are illustrated in order to describe the detailed example(s) of the present specification. The detailed terms of the apparatus (or device) or the detailed terms of the signal(s)/information specified in the drawings are merely exemplary. And, therefore, the technical characteristics of the present specification will not be limited only to the detailed terms used in the following drawings.

The present specification provides the following methods in order to resolve the above-described problems. The items of each method may be independently applied or may be applied in combination.

For example, when one tile includes two or more slices, a number of slice heights being explicitly signaled within CTU rows may be signaled. This may be referred to as syntax element num_exp_slice_in_tile. In this case, syntax elements (an array of slice_row_height_minus1) for indexes starting from 0 to num_exp_slice_in_tile−1 may be signaled. This may be signaled as ue(v) or u(v), and a number of bits signaling such syntax elements may vary in accordance with a number of CTU rows within a tile. Herein, ue(v) represents a 0-th order Exp-Golomb-coded syntax element, and u(v) indicates that v number of bits are used, where the value of v varies in accordance with the value of other syntax elements.

The height of each slice starting from a first slice to an n-th slice within the tile is given the values of slice_row_height_minus1+1 starting from 0 to num_exp_slice_in_tile−1, respectively. Herein, n is equal to a number of slices being explicitly signaled within the tile (num_exp_slice_in_tile).

Although remaining CTU rows that are larger than num_exp_slice_in_tile_minus1+1 and (explicitly signaled) last within the tile are still present, a new slice is defined within the tile. In other words, a slice(s) that is/are not explicitly signaled is/are present within the tile. The last slice may have a height that is equal to or smaller than the num_exp_slice_in_tile_minus1+1 that was last signaled.

As another example, when one tile includes two or more slices, a number of slices being included in the tile may be signaled. In this case, a flag indicating whether or not the heights of each slice within the tile are uniform may be signaled. When the heights of each slice within the tile are uniform, only one slice height may be signaled from the CTU rows. The height of each slice within the tile may be derived based on the signaled slice height. And, when the heights of each slice within the tile are not uniform, the heights of each slice excluding the last slice within the tile may be explicitly signaled.

In the present specification, information on the slice(s) and/or tile(s) may include information and/or syntax element(s) disclosed in Table 1 to Table 3. Image/video information may include high level syntax (HLS) disclosed in Table 1 to Table 3, and the high level syntax (HLS) may include information related to slice(s) and/or information related to tile(s). The information related to slice(s) may include information indicating one or more slices within a current picture, and the information related to tile(s) may include information indicating one or more tiles within the current picture. A tile including one or more slices and a slice including one or more tiles may be present in a picture.

As an embodiment, in order to represent a partitioned structure of a picture, syntaxes shown below in Table 4 and semantics shown below in Table 5 may be used for a PPS.

TABLE 4

| | Descriptor |
|---|---|
| pic_parameter_set_rbsp( ) { | |
| ... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     ... | |
|     if( rect_slice_flag && !single_slice_per_subpic_flag ) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] = = 0 && | |
|           slice_height_in_tiles_minus1[ i ] = = 0 ) { | |
|           num_exp_slices_in_tile[ i ] | ue(v) |
|           numExpSlicesInTile = num_exp_slices_in_tile[ i ] | |
|           for( j = 0; j < numExpSlicesInTile; j++ ) | |
|             exp_slice_height_in_ctu_minus1[ j ] | ue(v) |
|           i += NumSlicesInTile[ i ] | |
|         } | |
|         if( tile_idx_delta_present_flag && i < num_slices_in_pic_minus1 ) | |
|           tile_idx_delta[ i ] | se(v) |
|       } | |
|     } | |
|     ... | |
|   } | |
|   ... | |
| } | |

TABLE 5 num_exp_slices_in_tile[ i ] plus 1 specifies the number of exp_slice_height_in_cfu_minus1[ j ] present in the PPS. When not present, the value of num_exp_slices_in_tile_minus1[ i ] is inferred to be equal to 0.
exp_slice_height_in_ctu _minus1[ j ] plus 1 specifies the j-th explicitly signalled rectangular slice height in units of CTU rows for the case where the i-th slice contains a subset of CTU rows from a single file. The value of exp_slice _height_in_ctu_minus1[ j ] shall be in the range of 0 to RowHeight[ tileY ] − 1, inclusive, where tileY is the tile row index containing the slices.

Referring to Table 4 and Table 5, num_exp_slices_in_tile[i]+1 represents a number of exp_slice_height_in_ctu_minus1[j] being present in a PPS. When num_exp_slices_in_tile[i] is not present in the PPS, a value of num_exp_slices_in_tile_minus1[i] is derived as 0.

exp_slice_height_in_ctu_minus1[j]+1 indicates a height of a j-th rectangular slice being explicitly signaled in CTU row units, when an i-th slice includes a subset of CTU rows in a single tile. A value of exp_slice_height_in_ctu_minus1[j] should be within a range inclusive of 0 to RowHeight[tileY]−1. Herein, tileY is an index of a tile row including a slice.

That is, num_exp_slices_in_tile[i] may be referred to as information (number information) on a number of slices having its height explicitly signaled within the tile of a current picture. And, exp_slice_height_in_ctu_minus1[j] may be referred to as information (height information) on a height of each slice having its height explicitly signaled.

The number information and the height information may be an Exp-Golomb-coded syntax element.

The number information may be parsed based on information on a width and height of a slice including the tile. When the tile includes an i-th slice, the width information of the slice including the tile may correspond to the syntax element slice_width_in_tiles_minus1[i], and the height information of the slice including the tile may correspond to the syntax element slice_height_in_tiles_minus1[i]. The i-th slice may be a rectangular slice, and slices within the tile may also be partitioned to rectangular slices.

For example, the encoding apparatus may generate the number information and the height information based on the information on the slices of the current picture. The number information and the height information may be included in the image information and signaled to the decoding apparatus in a bitstream format.

When the number information is parsed from a PPS, as shown in Table 4, the decoding apparatus may parse the height information from the PPS based on the number information. For example, when a value of the number information is equal to n (wherein n is an integer equal to or larger than 0), the decoding apparatus may parse the height information on n number of slices (starting from the 0-th slice to the (n−1)-th slice within the tile) from the PPS. The height information may indicate each of the height of the 0-th slice to the height of the (n−1)-th slice in coding tree unit (CTU) rows.

Thereafter, the decoding apparatus may derive the heights of the remaining slices within the tile based on the height of the (n−1)-th slice. More specifically, the decoding apparatus may derive the heights of the remaining slices excluding the last slice within the tile starting from the n-th slice within the tile to be equal to the higher of the (n−1)-th slice. For this, the decoding apparatus may compare a remaining height of the tile, which is calculated by subtracting a sum of the heights of the slices starting from the 0-th slice to the (n−1)-th slice from a total height of the tile, so as to determine whether the remaining height is equal to or larger than a uniform slice height. Herein, a uniform slice may mean slices having a uniform height (the same height) within the tile. That is, the height of a uniform slice may be the same as the height of the (n−1)-th slice.

When the remaining height of the tile is equal to or larger than the height of a uniform slice, the height of the n-th slice may be derived as the height of the uniform slice. And, when the remaining height of the tile is less than the height of a uniform slice, the height of the n-th slice may be derived as the remaining height. Additionally, when the remaining height of the tile is equal to or larger than the height of a uniform slice, an updated remaining height may be derived by subtracting the height of the n-th slice from the remaining height. And, when the updated remaining height is equal to or larger than the height of a uniform slice, the decoding apparatus may derive the height of an (n+1)-th slice as the height of a uniform slice. When the updated remaining height is less than the height of a uniform slice, the decoding apparatus may derive the height of the height of an (n+1)-th slice as the updated remaining height. That is, excluding the last slice within the tile, the height of the slices starting from the n-th slice to the last slice may be derived as a uniform height. The height of the last slice may be equal to or less than the height of each uniform slice (slices starting from the (n−1)-th slice to a slice immediately before the last slice).

As an example, when 5 slices are included in one tile, and when the number information indicates 3, the height information for the first slice to the third slice within the tile may be parsed from the PPS, and the height of the fourth slice within the tile may be derived to have the same height as the third slice. In this case, the height of the fifth slice may be larger or less than the height of the fourth slice.

The decoding apparatus may derive a number of slices within the tile by performing the above-described scanning procedure. When the value of the number information is larger than 0, the procedure of deriving information on the height of each slice within the tile and information on a number of slices within the tile may be indicated as shown below in Table 5.

TABLE 6

```
Let tileHeight be equal to RowHeight[ tileY ]
remainingHeightInCtbsY = RowHeight[ tileY ]
fort( j = 0; j < num_exp_slices_in_tile - 1; j++ ) {
    SliceHeightInCtuMinus1[ i++ ] = exp_slice_height_in_ctu_minus1[ j ]
    remainingHeightInCtbsY -= SliceHeightInCtuMinus1[ j ]
}
uniformSliceHeightMinus1 = exp_slice_height_in_ctu_minus1[ num_
exp_slices_in_tile - 1 ]
while( remainingHeightInCtbsY >= (uniformSliceHeightMinus1 + 1) ) {
    SliceHeightInCtuMinus1[ i++ ] = uniformSliceHeightMinus1
    remainingHeightInCtbsY -= (uniformSliceHeightMinus1 + 1)
    j++
}
if(remainingHeightInCtbsY > 0 ) {
    SliceHeightInCtuMinus1[ i++ ] = remainingHeightInCtbsY
    j++
}
NumSlicesInTile[ i ] = j
```

In case of a rectangular slice, a list NumCtuInSlice[i] for i of a range inclusive of 0 to num_slices_in_pic_minus1 may indicate a number of CTUs within an i-th slice, matrix CtbAddrInSlice[i][j] for i of a range inclusive of 0 to num_slices_in_pic_minus1 and j of a range inclusive of 0 to NumCtuInSlice[i]−1 indicates a picture raster-scan address of a j-th CTB within the i-th slice and may be derived as shown below in Table 7.

TABLE 7

```
if( subpics_present_flag && single_slice_per_subpic_flag ) {
    for( i = 0; i <= sps_num_subpics_minus1; i++ )
        NumCtuInSlice[ i ] = 0
    for( i = 0; i < PicSizeInCtbs Y; i++ ) {
        sliceIdx = CtbToSubPicIdx[ i ]
        CtbAddrInSlice[ sliceIdx ][ NumCtuInSlice[ sliceIdx ] ] = i
        NumCtuInSlice[ sliceIdx ]++
    }
} else {
    tileIdx = 0
    for( i = 0, i <= num_slices_in_pic_minus1; i++ )
        NumCtuInSlice[ i ] = 0
    for( i = 0; i <= num_slices_in_pic_minus1; i++ ) {
        tileX = tileIdx % NumTileColumns
        tileY = tileIdx / NumTileColumns
        if( i = = num_slices_in_pic_minus1 ) {
            slice_width_in_tiles_minus1[ i ] = NumTileColumns - 1 - tileX
            slice_height_in_tiles_minus1[ i ] = NumTileRows - 1 - tileY
            num_slices_in_tile_minus1[ i ] = 0
        }
        if( slice_width_in_tiles_minus1[ i ] = = 0 && slice_height_in_tiles_minus1[ i ] = = 0 ) {
            ctbY = tileRowBd[ tileY ]
            numSlicesInTileMinus1 = NumSlicesInTile[ i ] - 1
            for( j = 0; j < numSlicesInTileMinus1; j++ )
{               AddCtbsToSlice( i, tileColBd[ tileX ], tileColBd[ tileX + 1 ],
                    ctbY, ctbY + SliceHeightInCtuMinus1[ i ] + 1 )
                ctbY += SliceHeightInCtuMinusi[ i ] + 1
                i++
            }
            AddCtbsToSlice( i, tileColBd[ tileX ][ tileColBd[ tileX + 1 ], ctbY, tileRowBd[ tileY + 1] )
        } else
            for( j = 0 j <= slice_height_in_tiles_minus1[ i ]; j++ )
                for(k = 0; k <= slice_width_in_tiles_minus1[ i ]; k++ )
                    AddCtbsToSlice( i, tileColBd[ tileX + k ], tileColBd[ tileX + k + 1 ],
                        tileRowBd[ tileY + j ], tileRowBd[ tileY+ j + 1 ] )
```

TABLE 7-continued

```
        if( tile_idx_delta_present_flag )
            tileIdx += tile_idx_delta[ i ]
        else {
            tileIdx += slice_width_in_tiles_minus1[ i ] + 1
            if( tileIdx % NumTileColumns = = 0 )
                tileIdx += slice_height_in_tiles_minus1[ i ] * NumTileColumns
        }
    }
}
```

As another embodiment, in order to represent a partitioned structure of a picture, syntaxes shown below in Table 8 and semantics shown below in Table 9 may be used for a PPS.

TABLE 8

| | Descriptor |
|---|---|
| pic_parameter_set_rbsp( ) { | |
| ... | |
|   no_pic_partition_flag | u(1) |
|   if( !no_pic_partition_flag ) { | |
|     ... | |
|     if( rect_slice_flag && !single_slice_per_subpic_flag ) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] = = 0 && | |
|           slice_height_in_tiles_minus1[ i ] = = 0 ) { | |
|           uniform_slice_spacing_flag[ i ] | u(1) |
|           if( uniform_slice_spacing_flag[ i ] ) | |
|             slice_row_height_in_ctu_minus1[ i ] | ue(v) |
|           else { | |
|             num_slices_in_tile_minus1[ i ] | ue(v) |
|             numSlicesInTileMinus1 = num_slices_in_tile_minus1[ i ] | |
|             for( j = 0; j < numSlicesInTileMinus1; j++ ) | |
|               slice_height_in_ctu_minus1[ j++ ] | ue(v) |
|           } | |
|         } | |
|         if( tile_idx_delta_present_flag && i < num_slices_in_pic_minus1 ) | |
|           tile_idx_delta[ i ] | se(v) |
|       } | |
|     } | |
|     ... | |
|   } | |
| ... | |
| } | |

Referring to Table 8 and Table 9, if a value of uniform_slice_spacing_flag[i] is equal to 1, this indicates that the CTU rows are uniformly distributed (or dispersed) throughout the entire tile and are signaled by using syntax elements uniform_slice_height_in_ctu_minus1 If the value of uniform_slice_spacing_flag[i] is equal to 0, this indicates that the CTU rows may or may not be uniformly distributed (or dispersed) throughout the entire tile and are signaled by using syntax elements num_slices_in_tile_minus1[i] and slice_height_in_ctu_minus1[i].

When the value of uniform_slice_spacing_flag is equal to 1, slice_rows_height_in_ctu_minus1[i]+1 indicates the height of the slices excluding the last slice of the tile in CTB units. A value of slice_height_in_ctu_minus1 should be within a range inclusive of 0 to RowHeight[tileY]−1. Herein, tileY is an index of a tile row including the slices.

num_slices_in_tile_minus1[i]+1 indicates a number of slices within the current tile, when an i-th slice includes a subset of CTU rows in a single tile, and when the value of uniform_slice_spacing_flag[i] is equal to 0. A value of num_slices_in_tile_minus1 should be within a range inclusive of 0 to RowHeight[tileY]−1. Herein, tileY is an index of a tile row including an i-th slice. When num_slices_in_tile_minus1[i] is not present, the value of num_slices_in_tile_minus1 is derived as 0.

slice_height_in_ctu_minus1[i]+1 indicates a height of an i-th rectangular slice in CTU row units, when an i-th slice includes a subset of CTU rows in a single tile. A value of slice_height_in_ctu_minus1 should be within a range inclusive of 0 to RowHeight[tileY]−1. Herein, tileY is an index of a tile row including an i-th slice.

For example, the encoding apparatus may generate at least one of uniform_slice_spacing_flag, slice_rows_height_in_ctu_minus1, num_slices_in_tile_minus1, and slice_height_in_ctu_minus1 based on information on slices of the current picture.

TABLE 9 uniform_slice_spacing_flag[ i ] equal to 1 specifics that CTU rows are distributed uniformly across the tile and signalled using the syntax elements uniform_slice_height_in_cfu_minus1[ i ] uniform_slice_spacing_flag[ i ] equal to 0 specifies that CTU rows may or may not be distributed uniformly across the tile and signalled using the syntax elements num_slices_in_tile minus1[ i ] and slice_height_in_ctu_minus1[ i ].
slice_rows_height_in_ctu_minus1[ i ] plus 1 specifies the height of the slice excluding the last slice of the tile in units of CTBs when uniform_slice_spacing_flag[ i ] is equal to 1. The value of slice_rows_height_in_ctu_minus1[ i ] shall be in the range of 0 to RowHeight[ tileY ] − 1, inclusive, where tileY is the tile row index containing the slices.
num_slices_in_tile_minus1[ i ] plus 1 specifies the number of slices in the current tile for the ease where the i-th slice contains a subset of CTU rows from a single tile and uniform_slice_spacing_flag[ i ] is equal to 0. The value of num_slices_in_tile_minus1[ i ] shall be in the range of 0 to RowHeight[ tileY ] − 1, inclusive, where tileY is the tile row index containing the i-th slice. When not present, the value of num_slices_in_tile_minus1[ i ] is inferred to be equal to 0.
slice_height_in_ctu_minus1[ i ] plus 1 specifies the height of the i-th rectangular slice in units of CTU rows for the case where the i-th slice contains a subset of CTU rows from a single tile. The value of slice_height in_ctu_minus1[ i ] shall be in the range of 0 to RowHleight[ tileY ] − 1, inclusive, where tileY is the tile row index containing the i-th slice.

When uniform_slice_spacing_flag is parsed from a PPS, as shown in Table 8, the decoding apparatus may parse slice_rows_height_in_ctu_minus1 or num_slices_in_tile_minus1 from the PPS based on a value of uniform_slice_spacing_flag. For example, if the value of uniform_slice_spacing_flag is equal to 1, the decoding apparatus may parse slice_rows_height_in_ctu_minus1 from the PPS and may then derive the parsed result as the height of the remaining slices excluding the last slice within the tile based on the value of slice_rows_height_in_ctu_minus1. If the value of uniform_slice_spacing_flag is equal to 0, the decoding apparatus may parse num_slices_in_tile_minus1 and slice_height_in_ctu_minus1 from the PPS and may derive the slices within the tile based on the parsed result.

For example, variables NumSlicesInTileMinus1[i] and SliceHeightInCtuMinus1[i+k] that are related to the number information and height information of slices within a tile may be derived as shown below. Herein, k may be within a range inclusive of 0 to NumSlicesInTileMinus1[i].

TABLE 10

```
if (uniform_slice_spacing_flag[ i ]) {
   remainingHeightInCtbsY = RowHeight[ tileY ]
   uniformSliceHeightMinus1 = slice_row_height_in_ctu_minus1[ i ]
   NumSlicesInTileMinus1[ i ] = 0
   while( remainingHeightInCtbsY >= (uniformSliceHeightMinus1 + 1) ) {
      NumSlicesInTileMinus[ i ]++
```

TABLE 10-continued

```
      SliceHeightInCtuMinus1[ i++ ] = uniformSliceHeightMinus1
      remainingHeightInCtbsY -= (uniformSliceHeightMinus1 + 1)
   }
   if(remainingHeightnCtbsy > 0) {
      NumSlicesInTileMinus1[ i ]++
      SliceHeightInCtuMinus1[ i++ ] = remainingHeightInCtbsY
   }
} else {
   remainingHeightInCtbsY = RowHeight[ tileY ]
   NumSlicesInTileMinus1[ i ] = 0
   for (j = 0; j < numSlicesInTileMinus1; j++ ) {
      NumSlicesInTileMinus1[ i ]++
      SliceHeightInCtuMinus1[ i++ ] = slice_height_in_ctu_minus1[ j ]
      remainingHeightInCtbsY -= (slice_height_in_ctu_minus1[ j ] + 1)
   }
   if(remainingHeightInCtbsY > 0) {
      NumSlicesInTileMinus1[ i ]++
      SliceHeightInCtuMinus1[ i++ ] = remainingHeightInCtbsY
   }
}
```

In case of a rectangular slice, a list NumCtuInSlice[i] for i of a range inclusive of 0 to num_slices_in_pic_minus1 may indicate a number of CTUs within an i-th slice, matrix CtbAddrInSlice[i][j] for i of a range inclusive of 0 to num_slices_in_pic_minus1 and j of a range inclusive of 0 to NumCtuInSlice[i]−1 indicates a picture raster-scan address of a j-th CTB within the i-th slice and may be derived as shown below in Table 11.

TABLE 11

```
if( subpics_present_flag && single_slice_per_subpic_flag ) {
   for( 1= 0; i <= sps_num_subpics_minus1; i++ )
      NumCtuInSlice[ i ] = 0
   for( i = 0; i < PicSizeInCtbsY; i++ ) {
      sliceIdx = CtbToSubPicIdx[ i ]
      CtbAddrInSlice[ sliceIdx ][ NumCtuInSlice[ sliceIdx ] ] = i
      NumCtuInSlice[ sliceIdx ]++
   }
} else {
   tileIdx = 0
   for( i = 0; i <= num_slices_in_pic_minus1; i++ )
      NumCtuInSlice[ i ] = 0
   for( i = 0; i <= num_slices_in_pic_minus1; i++ ) {
      tileX = tileIdx % NumTileColumns
      tileY = tileIdx / NumTileColumns
      if(i == num_slices_in_pic_minus1 ) {
         slice_width_in_tiles_ minus1[ i ] = NumTileColumns − 1 − tileX
         slice_height_in_tiles_minus1[ i ] = NumTileRows − 1 − tileY
         num_slices_in_tile_minus1[ i ] = 0
      }
      if( slice_width_in_tiles_minus1[ i ] == 0 && slice_height_in_tiles_minus1[ i ] == 0) {
         ctbY = tileRowBd[ tileY ]
         numSlicesInTileMinus1 = NumSlicesInTileMinus1[ i ]
         for( j = 0; i < numSlicesInTileMinus1; j++ )
         {         AddCtbsToSlice(i, tileColBd[ tileX ], tileColBd[ tileX + 1 ],
                     ctbY, ctbY + SliceHeightInCtuMinusi[ i ] + 1 )
            ctbY += SliceHeightinCtuMinus1[ i ] + 1
            i++
         }
         AddCtbsToSlice( i, tileColBd[ tileX ], tileColBd[ tileX + 1], ctbY, tileRowBd[ tileY + 1 ] )
      } else
         for( j = 0; j <= slice_height_in_tiles_minus1[ i ]; j++ )
            for( k = 0; k <= slice_width_in_tiles_minus1[ i ]; k++ )
               AddCtbsToSlice( i, tileColBd[ tileX + k ], tileColBd[ tileX + k + 1 ],
                     tileRowBd[ tileY + j ], tileRowBd[ tileY + j + 1 ] )
      if( tile_idx_delta_present_flag )
         tileIdx += tile_idx_delta[ i ]
```

TABLE 11-continued

```
    else {
        tileIdx += slice_width_in_tiles_minus1[ i ] + 1
        if( tileIdx % NumTileColumns = = 0 )
            tileIdx += slice_height_in_tiles_minus1[ i ] * NumTileColumns
        }
    }
}
```

Figure 8:
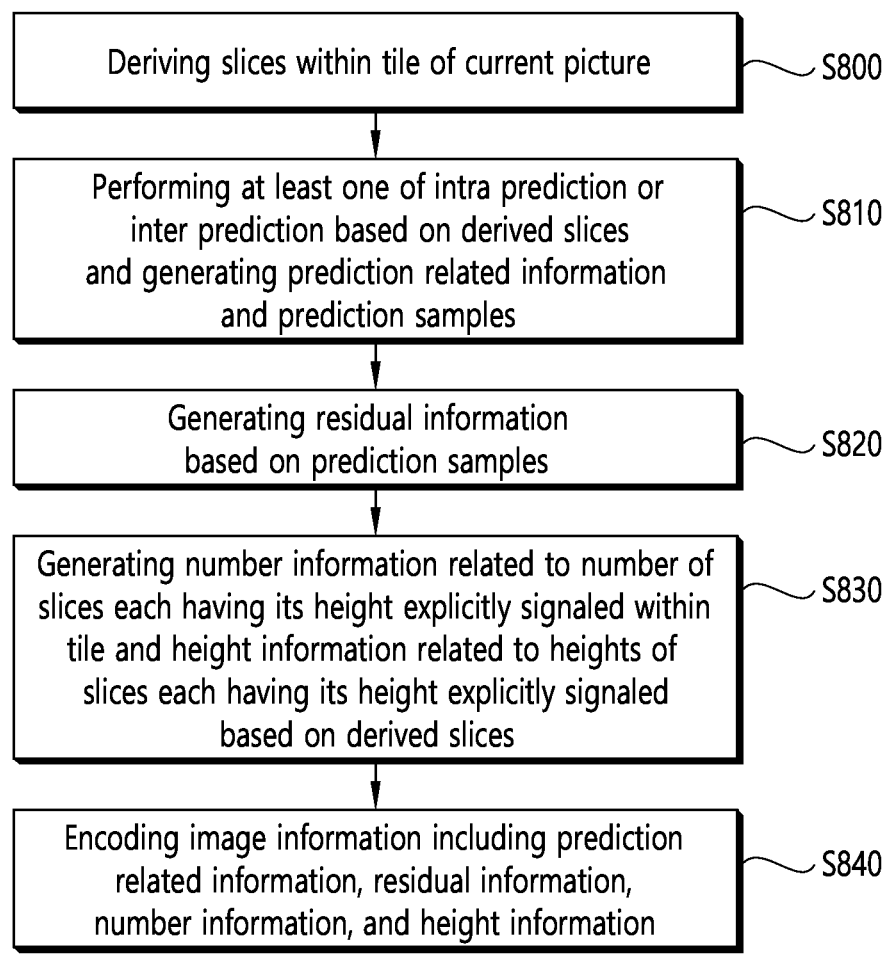
FIG. 8 and FIG. 9 respectively show general examples of a video/image encoding method and a related component according to an embodiment of the present disclosure.
Figure 9:
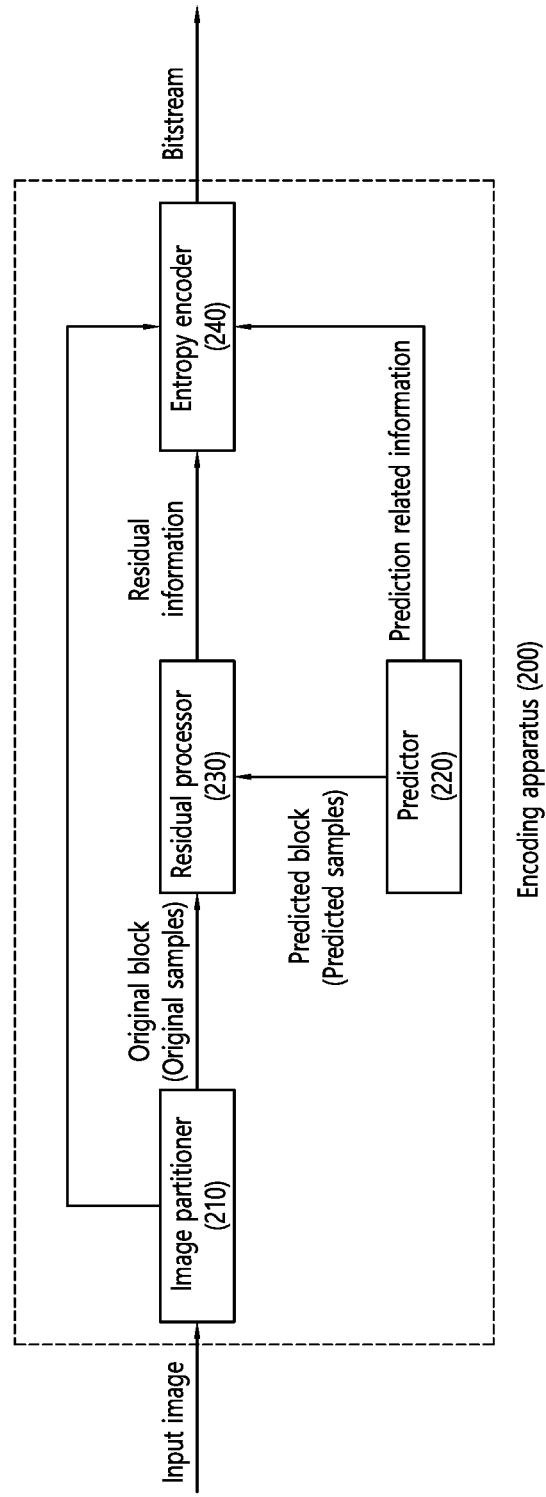

FIG. 8 and FIG. 9 respectively show general examples of a video/image encoding method and a related component according to an embodiment of the present disclosure.

The video/image encoding method disclosed in FIG. 8 may be performed by a(n) (video/image) encoding apparatus 200 that is disclosed in FIG. 2 and FIG. 9. More specifically, for example, S800 of FIG. 8 may be performed by the image partitioner 210 of the encoding apparatus 200, and S810 may be performed by the predictor 220 of the encoding apparatus 200. S820 may be performed by the residual processor 230 of the encoding apparatus 200. And, S830 and S840 may be performed by the entropy encoder 240 of the encoding apparatus 200. The video/image encoding method disclosed in FIG. 8 may include the embodiments that are described above in the present specification.

More specifically, referring to FIG. 8 and FIG. 9, the image partitioner 210 of the encoding apparatus may derive slices within a tile of a current picture (S800). For example, the image partitioner 210 may partition an input image (or picture, frame) to one or more CUs. The input image may include one or more pictures. A picture may be partitioned to one or more tiles, bricks, slices, and/or tile groups. A slice may include one or more bricks, tiles, and/or tile groups. A brick may include one or more CTU rows. A tile group may include one or more tiles. A tile may include one or more CTUs. The CTU may be partitioned to one or more CUs. When a specific slice within the current picture is a rectangular slice, the image partitioner 210 may partition the rectangular slice to a plurality of tiles, and, among the plurality of tiles, the image partitioner 210 may partition at least one tile and then derive a plurality of rectangular slices.

The predictor 220 of the encoding apparatus may perform at least one of intra prediction or inter prediction on a current block based on the slices that are derived in the image partitioner 210 and may then generate prediction samples (prediction block) and prediction related information of the current block (S810). The predictor 220 may determine whether intra prediction is being applied, or whether inter prediction is being applied in the current block or CU units. The predictor 220 may deliver diverse information related to prediction (prediction related information) to the entropy encoder 240. Herein, the prediction related information may include information related to an inter prediction mode and information related to an intra prediction mode. When the prediction mode of the current block is the inter prediction mode, the prediction samples may be generated in the inter predictor 221 of the predictor 220. And, when the prediction mode of the current block is the intra prediction mode, the prediction samples may be generated in the intra predictor 222 of the predictor 220.

The residual processor 230 of the encoding apparatus may generate residual samples and residual information based on prediction samples generated from the predictor 220 and an original picture (original block, original samples) (S820). Herein, the residual information is information related to the residual samples, and the residual information may include information related to (quantized) transform coefficients for the residual samples.

The adder (or reconstructor) of the encoding apparatus may generate reconstructed samples (reconstructed picture, reconstructed block, reconstructed sample array) by adding the residual samples that are generated in the residual processor 230 and the prediction samples that are generated in the inter predictor 221 or intra predictor 222.

The entropy encoder 240 of the encoding apparatus may generate information related to partitioning based on a partitioning structure, which is derived in the image partitioner 210. The partitioning related information may include information (number information) on a number of slices each having its height explicitly signaled within a tile and information (height information) on a height of the slices each having its height explicitly signaled. For example, the entropy encoder 240 may generate number information related to a number of slices each having its height explicitly signaled (provided) within the tile and height information related to a height of the slices each having its height explicitly signaled (provided) based on the slices that are derived in the image partitioner 210 (S830). Herein, the number information may include the above-described syntax element(s) num_exp_slices_in_tile and/or num_slices_in_tile_minus1. The height information may include the above-described syntax element(s) exp_slice_height_in_ctu_minus1, slice_rows_height_in_ctu_minus1, and/or slice_height_in_ctu_minus1.

The entropy encoder 240 may encode image information including partitioning related information, which includes the number information and the height information, prediction related information, which is generated in the predictor 220, and/or residual information, which is generated in the residual processor 230 (S840). The information that is encoded in the entropy encoder 240 may be outputted in a bitstream format. The bitstream may be transmitted to the decoding apparatus through a network or storage medium.

For example, the entropy encoder 240 may include image information, which include syntax element num_exp_slices_in_tile as the number information and syntax element exp_slice_height_in_ctu_minus1 as the height information based on the above-described Table 4 and Table 5. The height information may indicate the height of slices each having its height explicitly signaled within the tile in CTU row units, and, for this, the height information may include syntax elements for the slices each having its height explicitly signaled. The number of syntax elements being included in image information may be the same as the number information value.

As another example, the entropy encoder 240 may encode image information including syntax elements uniform_slice_spacing_flag, num_slices_in_tile_minus1, slice_rows_height_in_ctu_minus1, and/or slice_height_in_ctu_minus1 based on the above-described Table 8 and Table 9. The syntax elements num_slices_in_tile_minus1, slice_rows_height_in_ctu_minus1, and slice_height_ in_ctu_minus1 may be included, or may not be included in the image information based on the uniform_slice_spacing_flag value.

The entropy encoder 240 may signal the number information and the height information through a picture parameter set (PPS) within the image information. In this case, the entropy encoder 240 may include the number information and/or the height information by using an Exp-Golomb method.

Figure 10:
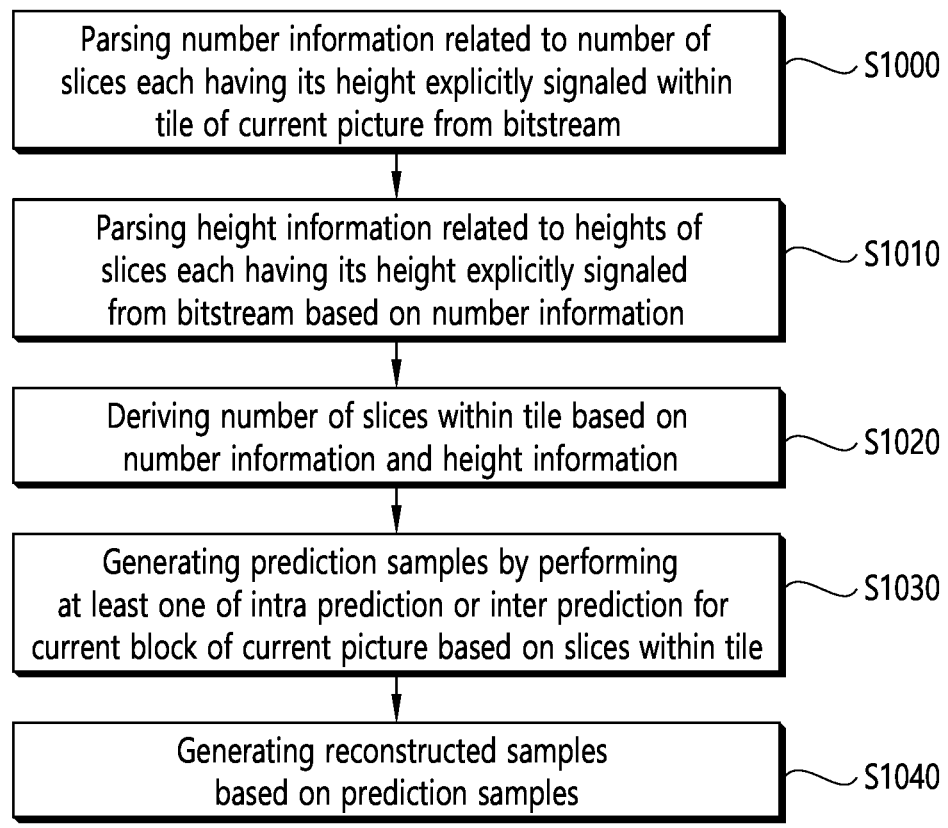
FIG. 10 and FIG. 11 respectively show general examples of a video/image decoding method and a related component according to an embodiment of the present disclosure.
Figure 11:
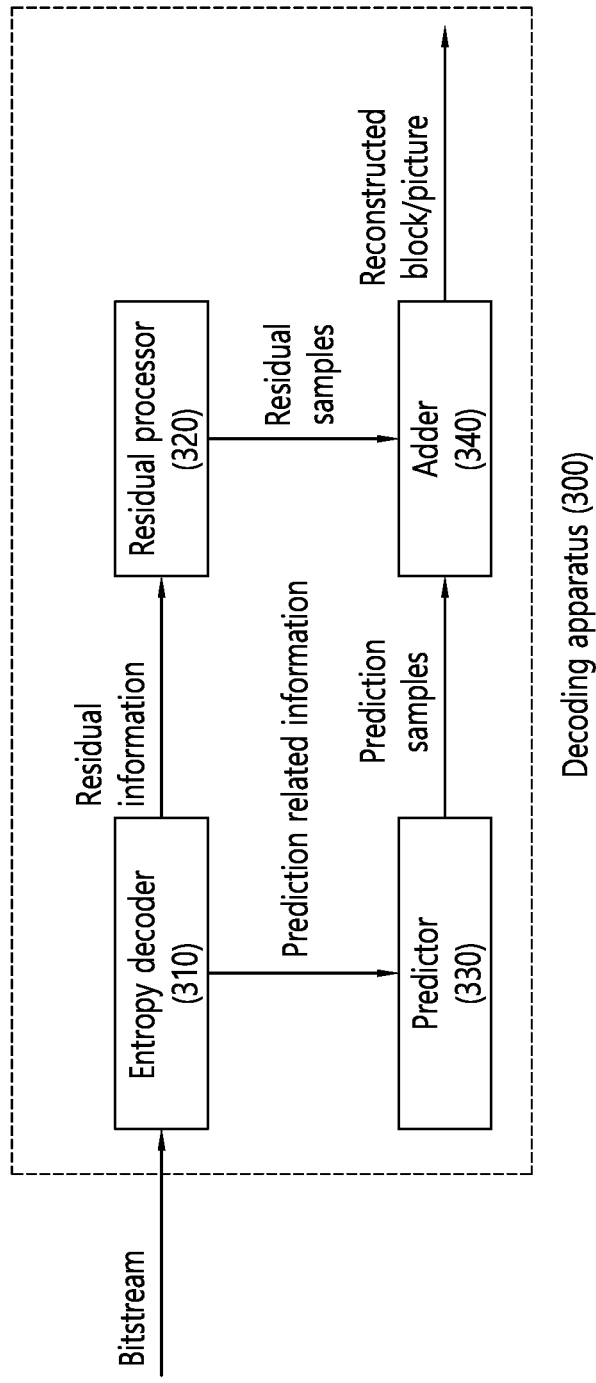

FIG. 10 and FIG. 11 respectively show general examples of a video/image decoding method and a related component according to an embodiment of the present disclosure.

The video/image decoding method disclosed in FIG. 10 may be performed by a (video/image) decoding apparatus 300 that is disclosed in FIG. 3 and FIG. 11. More specifically, for example, S1000 to S1020 of FIG. 10 may be performed by the entropy decoder 310 of the decoding apparatus. S1030 of FIG. 10 may be performed by the predictor 330 of the decoding apparatus. And, S1040 of FIG. 10 may be performed by the adder 340 of the decoding apparatus. The video/image decoding method disclosed in FIG. 10 may include the embodiments that are described above in the present specification.

Referring to FIG. 10 and FIG. 11, the entropy decoder 310 of the decoding apparatus may obtain partitioning related information, residual information, prediction related information (inter/intra prediction differentiation information, intra prediction mode information, inter prediction mode information, and so on), in-loop filtering related information, and so on, from a bitstream. Herein, the partitioning related information may include information (number information) on a number of slices each having its height explicitly signaled, among slices within a tile of a current picture, information (height information) on the height of slices each having its height explicitly signaled, and so on.

For example, the entropy decoder 310 may parse information (number information) related to a number of slices each having its height explicitly signaled, among slices within a tile of a current picture, from a bitstream (S1000), and may parse information (height information) related to the height of slices each having its height explicitly signaled from the bitstream based on the number information (S1010). More specifically, the entropy decoder 310 may parse the number information and the height information from a picture parameter set (PPS) of the bitstream based on the above-described Table 4. Herein, the number information may be parsed based on information on a width and height of a slice including the tile. At this point, the slice including the tile and/or slices within the tile may be a rectangular slice(s). The number information and the height information may be Exp-Golomb-coded syntax elements. The height information may include syntax elements for each slice having its height explicitly signaled. The number of syntax elements may be the same as the number information value.

For example, the entropy decoder 310 may parse syntax elements slice_width_in_tiles_minus1 and slice_height_in_tiles_minus1 from the picture parameter set (PPS) based on Table 4, and the entropy decoder 310 may parse syntax element num_exp_slices_in_tile from the picture parameter set (PPS) based on the values of the syntax elements slice_width_in_tiles_minus1 and slice_height_in_tiles_minus1. And, the entropy decoder 310 may parse a number of exp_slice_height_in_ctu_minus1 that is equivalent to the value of the syntax element num_exp_slices_in_tile from the picture parameter set (PPS).

When the value of the number information is equal to n, the entropy decoder 310 may derive heights of a 0-th slice to an (n−1)-th slice within the tile based on the height information. And, the entropy decoder 310 may derive a height of an n-th slice within the tile based on the height of the (n−1)-th slice. That is, the height of the n-th slice may be derived to be the same as the height of the (n−1)-th slice. Herein, the n-th slice may not be the last slice within the tile. In other words, the entropy decoder 310 may derive the heights of the remaining slices (slices that are not explicitly signaled) excluding the last slice within the tile to have the same height as the (n−1)-th slice. Therefore, the heights of the slices starting from the n-th slice to the last slice within the tile may be uniform with the exception for the last slice within the tile. The entropy decoder 310 may derive the height of the last slice within the tile based on a remaining height after subtracting the heights of other slices within the tile from the height of the tile. When the heights of all slices within the tile are derived, the entropy decoder 310 may derive a number of slices within the tile (S1020). Herein, the number of slices within the tile may correspond to a number of slices stating from the 0-th slice to the last slice within the tile.

The decoding apparatus 300 may decode the current picture based on the number information, the height information, and so on. More specifically, the residual processor 320 of the decoding apparatus may generate residual samples based on residual information that is obtained from the entropy decoder 310. The predictor 330 of the decoding apparatus may perform inter prediction and/or intra prediction on a current block that is included in the slices within the picture based on prediction related information that is obtained from the entropy decoder 310 so as to generate prediction samples (S1030). The adder 340 of the decoding apparatus may generate reconstructed samples based on the prediction samples that are generated in the predictor 330 and the residual samples that are generated in the residual processor 320 (S1040). And, the adder 340 of the decoding apparatus may generate a reconstructed picture (reconstructed block) based on the reconstructed samples.

Thereafter, an in-loop filtering procedure, such as deblocking filtering, SAO, and/or ALF procedures, may be applied to the reconstructed picture as needed, in order to enhance subjective/objective picture quality.

Meanwhile, as another example, the entropy decoder 310 may parse syntax elements slice_width_in_tiles_minus1 and slice_height_in_tiles_minus1 from a picture parameter set (PPS) of a bitstream based on Table 8, and the entropy decoder 310 may parse syntax element uniform_slice_spacing_flag from the picture parameter set (PPS) based on values of the syntax elements slice_width_in_tiles_minus1 and slice_height_in_tiles_minus1. In this case, the entropy decoder 310 may parse syntax element slice_rows_height_in_ctu_minus1 or parse syntax element num_slices_in_tile_minus1 from the picture parameter set (PPS) based on the value of syntax element uniform_slice_spacing_flag. The syntax element slice_rows_height_in_ctu_minus1 may be parsed, when the value of the syntax element uniform_slice_spacing_flag is equal to 1, and the syntax element num_slices_in_tile_minus1 may be parsed, when the value of the syntax element uniform_slice_spacing_flag is equal to 0.

When the syntax element slice_rows_height_in_ctu_minus1 is parsed, the entropy decoder 310 may derive the heights of the remaining slices excluding the last slice within the tile as the value of slice_rows_height_in_ctu_minus1.

When the syntax element num_slices_in_tile_minus1 is parsed, the entropy decoder 310 may parse a number of syntax element slice_height_in_ctu_minus1 corresponding to the value of the syntax element num_slices_in_tile_minus1, and the values may be each be derived as the heights of each slice within the tile, respectively.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present document may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 12:
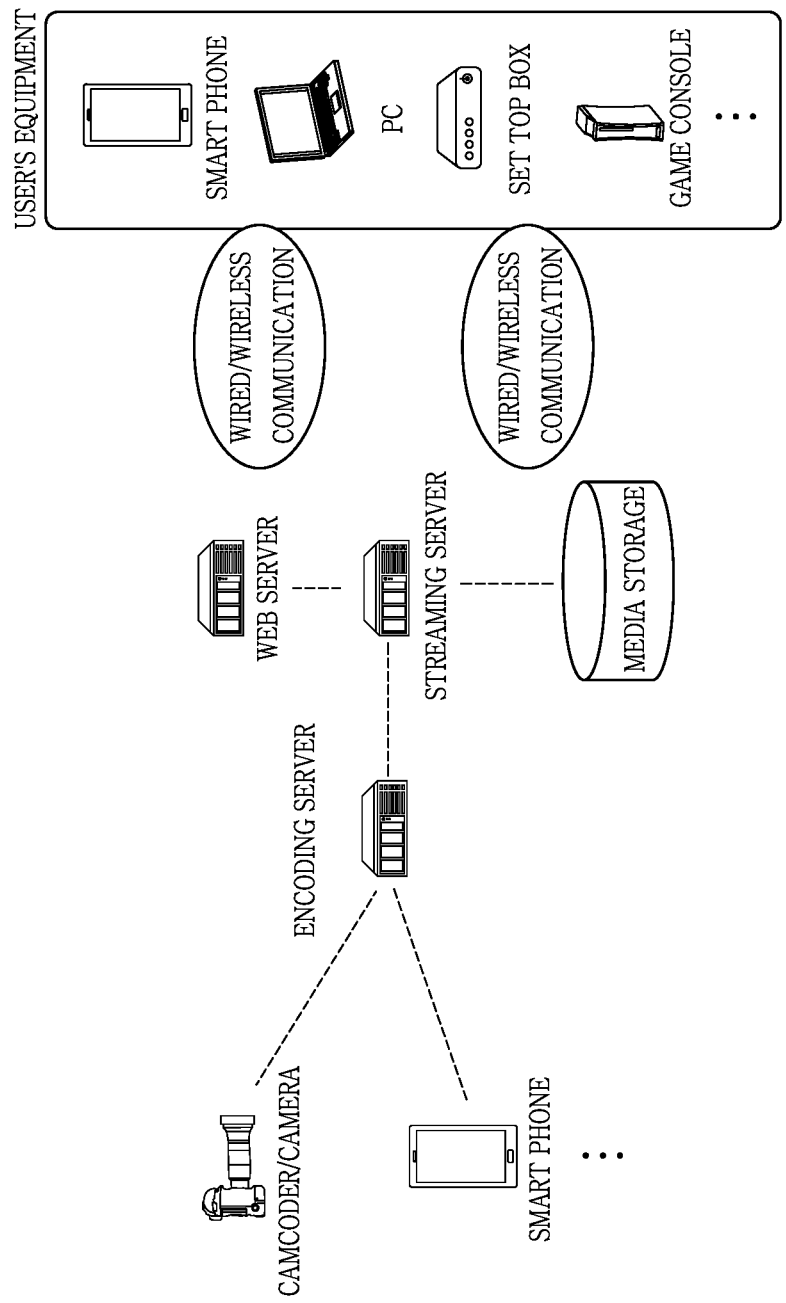
FIG. 12 shows an example of a contents streaming system to which the embodiment of the present disclosure may be applied.

FIG. 12 represents an example of a contents streaming system to which the embodiment of the present document may be applied.

Referring to FIG. 12, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case in which the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. A video decoding method performed by a video decoding apparatus, the method comprising:
parsing number information related to a number of specific slices each having its height explicitly signaled within a tile of a current picture from a bitstream;
parsing height information related to heights of the specific slices each having its height explicitly signaled from the bitstream based on the number information;
deriving a number of slices within the tile based on the number information and the height information;
generating prediction samples by performing at least one of intra prediction or inter prediction on a current block of the current picture based on at least one of the slices within the tile; and
generating reconstructed samples based on the prediction samples,
wherein the height information includes a same number of syntax elements as the number of the specific slices,
wherein, based on the number of the specific slices being equal to n, n being an integer greater than 0, heights of a 0-th slice to an (n−1)-th slice within the tile are derived based on the syntax elements,
wherein a height of an n-th slice within the tile is derived to be the same as the height of the (n−1)-th slice based on a remaining height of the tile that is calculated by subtracting the heights of the slices starting from the 0-th slice to the (n−1)-th slice from a total height of the tile being equal to or larger than the height of the (n−1)-th slice,
wherein the tile is configured to be partitioned to the slices, each of the slices including a subset of CTU rows in the tile and having same width as the tile,
wherein the number information includes a syntax element num_exp_slices_in_tile included in a picture parameter set, and
wherein the height information includes a syntax element exp_slice_height_in_ctu_minus1 included in the picture parameter set.

2. The video decoding method of claim 1, wherein the number information and the height information include an Exp-Golomb-coded syntax element.

3. The video decoding method of claim 1, wherein slices within the tile are rectangular slices.

4. The video decoding method of claim 1, wherein the number information is parsed based on information related to a width and height of a slice including the tile.

5. A video encoding method performed by a video encoding apparatus, the method comprising:
deriving slices within a tile of a current picture;
generating prediction related information and prediction samples by performing at least one of intra prediction or inter prediction based on at least one of the derived slices;
generating residual information based on the prediction samples;
generating number information related to a number of specific slices each having its height explicitly signaled within the tile and height information related to heights of the specific slices each having its height explicitly signaled; and
encoding image information including the prediction related information, the residual information, the number information, and the height information,
wherein the height information includes a same number of syntax elements as the number of the specific slices,
wherein, based on the number of the specific slices being equal to n, n being an integer greater than 0, the syntax elements in the height information indicate heights of a 0-th slice to an (n−1)-th slice within the tile,
wherein a height of an n-th slice within the tile is the same as the height of the (n−1)-th slice in case a remaining height of the tile that is calculated by subtracting the heights of the slices starting from the 0-th slice to the (n−1)-th slice from a total height of the tile is equal to or larger than the height of the (n−1)-th slice,
wherein the tile is configured to be partitioned to the slices, each of the slices including a subset of CTU rows in the tile and having same width as the tile,
wherein the number information includes a syntax element num_exp_slices_in_tile included in a picture parameter set, and
wherein the height information includes a syntax element exp_slice_height_in_ctu_minus1 included in the picture parameter set.

6. A non-transitory computer readable digital storage medium storing a bitstream generated by a video encoding method, wherein the video encoding method comprises:
deriving slices within a tile of a current picture;
generating prediction related information and prediction samples by performing at least one of intra prediction or inter prediction based on at least one of the derived slices;
generating residual information based on the prediction samples;
generating number information related to a number of specific slices each having its height explicitly signaled within the tile and height information related to heights of the specific slices each having its height explicitly signaled; and
encoding image information to generate the bitstream, wherein the image information includes the prediction related information, the residual information, the number information, and the height information,
wherein the height information includes a same number of syntax elements as the number of the specific slices,
wherein, based on the number of the specific slices being equal to n, n being an integer greater than 0, the syntax elements in the height information indicate heights of a 0-th slice to an (n−1)-th slice within the tile,
wherein a height of an n-th slice within the tile is the same as the height of the (n−1)-th slice in case a remaining height of the tile that is calculated by subtracting the heights of the slices starting from the 0-th slice to the (n−1)-th slice from a total height of the tile is equal to or larger than the height of the (n−1)-th slice,
wherein the tile is configured to be partitioned to the slices, each of the slices including a subset of CTU rows in the tile and having same width as the tile,
wherein the number information includes a syntax element num_exp_slices_in_tile included in a picture parameter set, and
wherein the height information includes a syntax element exp_slice_height_in_ctu_minus1 included in the picture parameter set.

7. A transmission method of data for a video, the method comprising:
- obtaining a bitstream for the video, wherein the bitstream is generated based on deriving slices within a tile of a current picture, generating prediction related information and prediction samples by performing at least one of intra prediction or inter prediction based on at least one of the derived slices, generating residual information based on the prediction samples, generating number information related to a number of specific slices each having its height explicitly signaled within the tile and height information related to heights of the specific slices each having its height explicitly signaled, and encoding image information including the prediction related information, the residual information, the number information, and the height information; and
- transmitting the data comprising the bitstream,
- wherein the height information includes a same number of syntax elements as the number of the specific slices,
- wherein, based on the number of the specific slices being equal to n, n being an integer greater than 0, the syntax elements in the height information indicate heights of a 0-th slice to an (n−1)-th slice within the tile,
- wherein a height of an n-th slice within the tile is the same as the height of the (n−1)-th slice in case a remaining height of the tile that is calculated by subtracting the heights of the slices starting from the 0-th slice to the (n−1)-th slice from a total height of the tile is equal to or larger than the height of the (n−1)-th slice,
- wherein the tile is configured to be partitioned to the slices, each of the slices including a subset of CTU rows in the tile and having same width as the tile,
- wherein the number information includes a syntax element num_exp_slices_in_tile included in a picture parameter set, and
- wherein the height information includes a syntax element exp_slice_height_in_ctu_minus1 included in the picture parameter set.

* * * * *